United States Patent [19]

Maeshima

[11] Patent Number: 5,038,225
[45] Date of Patent: Aug. 6, 1991

[54] IMAGE READING APPARATUS WITH BLACK-LEVEL AND/OR WHITE LEVEL CORRECTION

[75] Inventor: Katsuyoshi Maeshima, Yokohama, Japan

[73] Assignee: Canon Kabushiki Kaisha, Tokyo, Japan

[21] Appl. No.: 33,776

[22] Filed: Apr. 3, 1987

[30] Foreign Application Priority Data

| Apr. 4, 1986 | [JP] | Japan | 61-78722 |
| Apr. 4, 1986 | [JP] | Japan | 61-78724 |
| Apr. 4, 1986 | [JP] | Japan | 61-78725 |
| Feb. 13, 1987 | [JP] | Japan | 62-31190 |

[51] Int. Cl.$^5$ .................................... H04M 1/40
[52] U.S. Cl. .................... 358/461; 358/464; 358/466; 382/54
[58] Field of Search ............... 358/282, 461, 464, 466; 382/54

[56] References Cited

U.S. PATENT DOCUMENTS

| 4,578,711 | 3/1986 | White et al. | 358/282 |
| 4,589,034 | 5/1986 | Yokomizo | 382/50 |
| 4,675,533 | 6/1987 | Shimizu | 250/578 |
| 4,691,240 | 9/1987 | Kurusu | 358/282 |
| 4,691,365 | 9/1987 | Nagashima | 382/54 |
| 4,748,677 | 5/1988 | Yokomizo | 382/50 |

Primary Examiner—Edward L. Coles, Sr.
Attorney, Agent, or Firm—Fitzpatrick, Cella, Harper & Scinto

[57] ABSTRACT

An image reading apparatus such as facsimile or digital copying apparatus comprises: a lamp to illuminate an original; an image reading device such as CCD to read the original image line by line; a memory to store dark-output data (data output from a reading while the lamp is off) of the reading device by an amount of one line; and a correction circuit to correct the image data obtained by reading the image by the reading device every pixel on the basis of the data stored in the memory. A black level of the image data is corrected by the correction circuit and the memory stores the dark output data of the reading device before the image is read. The memory also stores the output data of the reading device when the lamp is off. With this apparatus, the unevenness of the output image signals which is caused due to a variation in dark currents obtained by photoelectrically reading the original image can be corrected by eliminating the unevennesses of the black and white levels of the CCD line sensor. Thus, a preferable output image can be derived.

26 Claims, 14 Drawing Sheets

IMAGE READING APPARATUS WITH BLACK-LEVEL AND/OR WHITE LEVEL CORRECTION

BACKGROUND OF THE INVENTION

1. Field of the Invention

The present invention relates to an image reading apparatus and, more particularly, to an image reading apparatus having the function of correcting an image signal.

2. Related Background Art

In facsimile apparatuses, digital apparatuses, and the like, an original image to be transmitted or copied is photoelectrically read by means of a line sensor such as CCD or the like. The line sensor, in general, has thousands of photosensing elements, and separates the image of one line in to thousands of pixels and outputs an image signal indicative of light and dark of each pixel. In order to preferably read the image by such a line sensor, the output level of each photo sensing element for the images of the same density must be constant. However, if there is a variation in sensitivity or offset (dark current) of each photosensing element, the outputs of the respective photosensing elements are not uniform. In this case, for example, if a half-tone image is reproduced using the read-out signal, there occurs the inconvenience that black stripes appear in the reproduced image.

On the other hand, in the case of an apparatus in which the line sensor can independently output the image signal of the odd-number pixels and the image signal of the even-number pixels, the image processes such as amplification, digitization, and the like are executed by a different system for each of the two outputs.

In the foregoing apparatus in which the line sensor has two outputs which are powered by a respective plurality of systems, there is a case where the difference among the respective systems is larger than the variation among the pixels. Namely, since independent amplifiers, A/D converters, and the like are used for the outputs of the respective systems, a variation of offsets or the like of the respective systems occurs, causing the image quality to deteriorate. Such a difference can be removed by adjusting the gain of the amplifier of each system. However, the adjustment becomes very complicated and it is almost impossible to remove the time-dependent change.

SUMMARY OF THE INVENTION

The present invention is made in consideration of the foregoing points and it is an object of the invention to provide an image reading apparatus in which the unevenness of the image signals which is caused due to a variation in dark currents when an image is photoelectrically read is corrected and a good image reading output can be obtained.

It is another object of the invention to provide an image reading apparatus in which the black level is adjusted for every pixel of a line sensor and a good image signal can be obtained.

Still another object of the invention is to provide an image reading apparatus which can effectively eliminate the unevenness of the outputs of the black and white levels of a line sensor.

Still another object of the invention is to provide an image reading apparatus which can preferably correct a variation in outputs of a plurality of systems of a line sensor having the outputs of those systems.

The above and other objects, operations, and advantages of the present invention will become apparent from the following detailed description and the appended claims with reference to the accompanying drawings.

DETAILED DESCRIPTION OF THE PREFERRED EMBODIMENTS

The present invention will be described hereinbelow with respect to the preferred embodiments thereof, with reference to the drawings.

Figure 1:
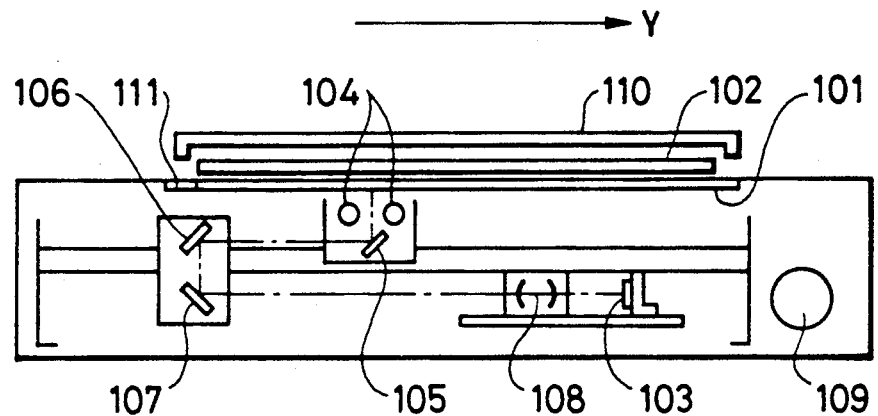
FIG. 1 is a diagram showing a construction of an image reading apparatus in the first embodiment to which the present invention is applied.

FIG. 1 shows the first embodiment of an image reading apparatus to which the invention is applied. Reference numeral 101 denotes an original base; 102 is an original pressing plate; 103 an image reading CCD consisting of a plurality of photosensing elements arranged in a line; 104 a fluorescent lamp to illuminate an original; 105 to 107 mirrors; 108 an image forming lens; and 109 a motor. By moving the lamp 104 and mirrors 105 to 107 by means of the motor 109, the original is sub-scanned in the sub scanning direction Y, thereby sequentially forming an original image on the CCD 103. A reference white plate 111 is provided to obtain data for shading correction. The fluorescent lamp 104 and mirrors 105 to 107 are disposed at positions such that the lamp 104 illuminates the reference white plate 111 and the light reflected from the plate 111 is led to the CCD 103. This state is called the home position.

Figure 2:
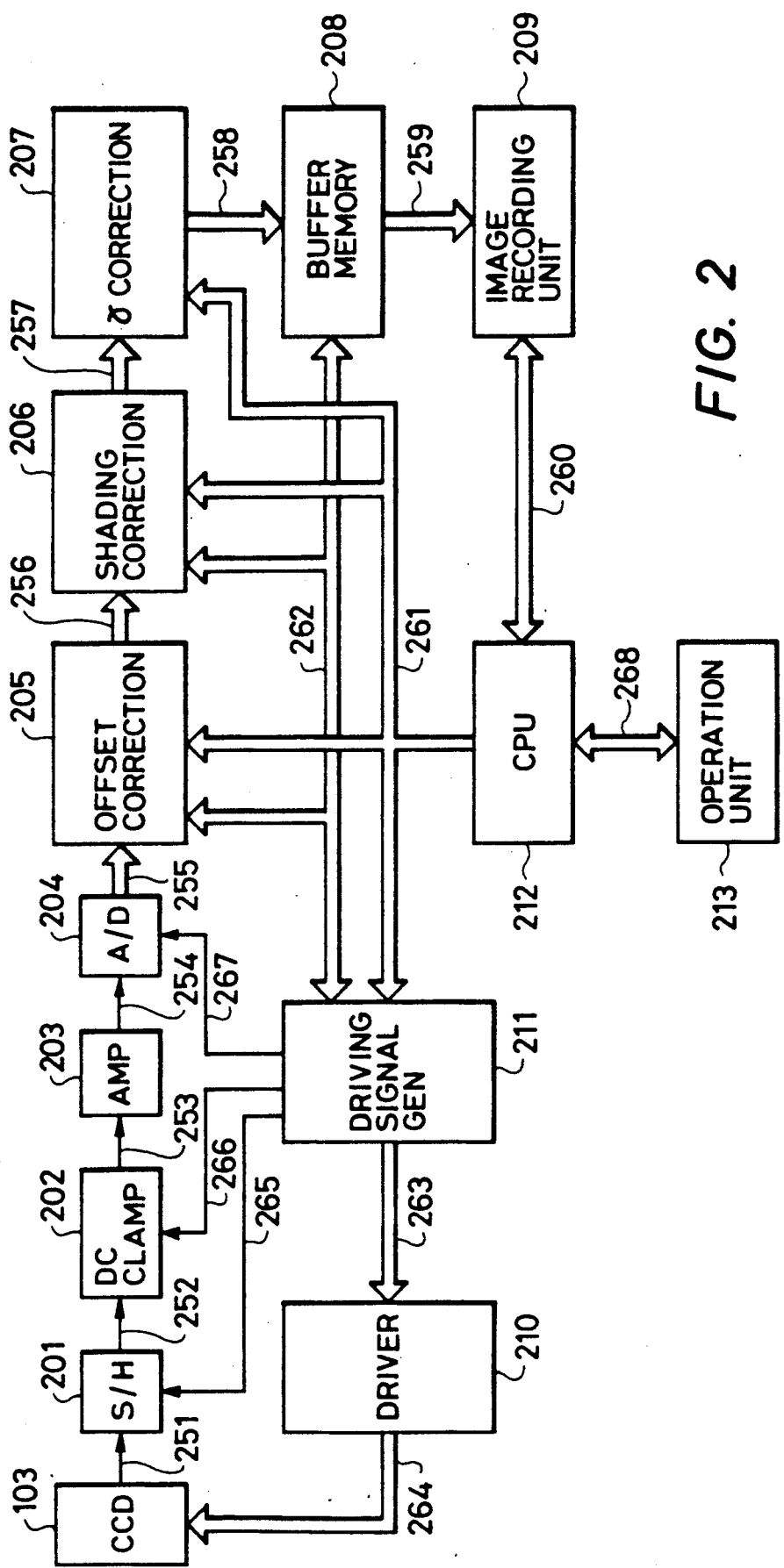
FIG. 2 is a block diagram showing a circuit constitution of the image reading apparatus shown in FIG. 1.

FIG. 2 is a block diagram showing a circuit construction of the reading apparatus.

An image signal is obtained by reading the image line by line by the CCD 103. The noise component of this image signal is removed by a sample-and-hold (S/H) circuit 201 which is made operative in response to a timing signal 265, so that only the signal component is taken out. Further, the black level is reproduced by a DC clamping circuit 202. The output of the CCD 103 is taken out as a relative output for the black level. Therefore, the black level signal is detected every line by the DC clamping circuit 202 and the black level is always kept constant (e.g., 0 V), thereby correcting the output of the CCD 103 to the absolute level. Numeral 266 denotes a signal indicative of the period of time when the black level signal is output from the CCD 103. The level corrected image signal is then amplified by an amplifier 203 to the signal level suitable for the A/D conversion. In this embodiment, the EF8308 (made by Tomson Co., Ltd.) is used as an A/D converter 204. The A/D converter 204 converts the analog input signal of 0 to 2 V into digital signals of values from 0 to $FF_H$. On the other hand, since the level corrected white level output of the CCD 103 is 0.3 V, the amplifier 203 amplifies this white level output 6.6 times so as to become almost 2 V. Although not shown, a circuit to always adjust the light amount of the fluorescent lamp 104 such that the white output of the CCD 103 is set to 0.3 V is provided. An inverting circuit is provided at the output terminal of the A/D converter 204. The image data which has been A/D converted by the A/D converter 204 for every pixel in accordance with a timing signal 267 is output to an image signal line 255 in a manner such that true white is set to "$00_H$" and true black is set to "$FF_H$".

The image data entered to an offset correction circuit 205 is corrected as to dark voltage and further sent to a shading correction circuit 206, and the sensitivity is corrected.

The sensitivity corrected image data is transmitted to a gamma ($\gamma$) correction circuit 207. The $\gamma$ correction circuit 207 is a RAM in which the density conversion data is stored. A CPU 212 can write a desired conversion curve by designating a desired density by the user or on the basis of the density characteristic of the recording unit.

A buffer memory 208 is provided to adjust the output speed of the image data in accordance with the recording unit when the image data is recorded by an image recording unit (printer) 209. The buffer memory 208 has a memory capacity of the image data of two lines.

A driving signal generator 211 generates a clock necessary to drive the CCD 103 and further generates an address corresponding to each pixel position of the image of one line. By use of this address, each circuit knows from which position in the main scanning the input image data was obtained.

A driver 210 outputs a driving signal 264 to drive the CCD 103 in response to various signals 263 from the driving signal generator 211.

The CPU 212 is mainly constituted by a microcomputer and controls an operation unit 213 and the printer 209. The CPU 212 produces signals to control each section and supplies these signals to each section through an address bus 261 and a data bus 261.

Figure 6:
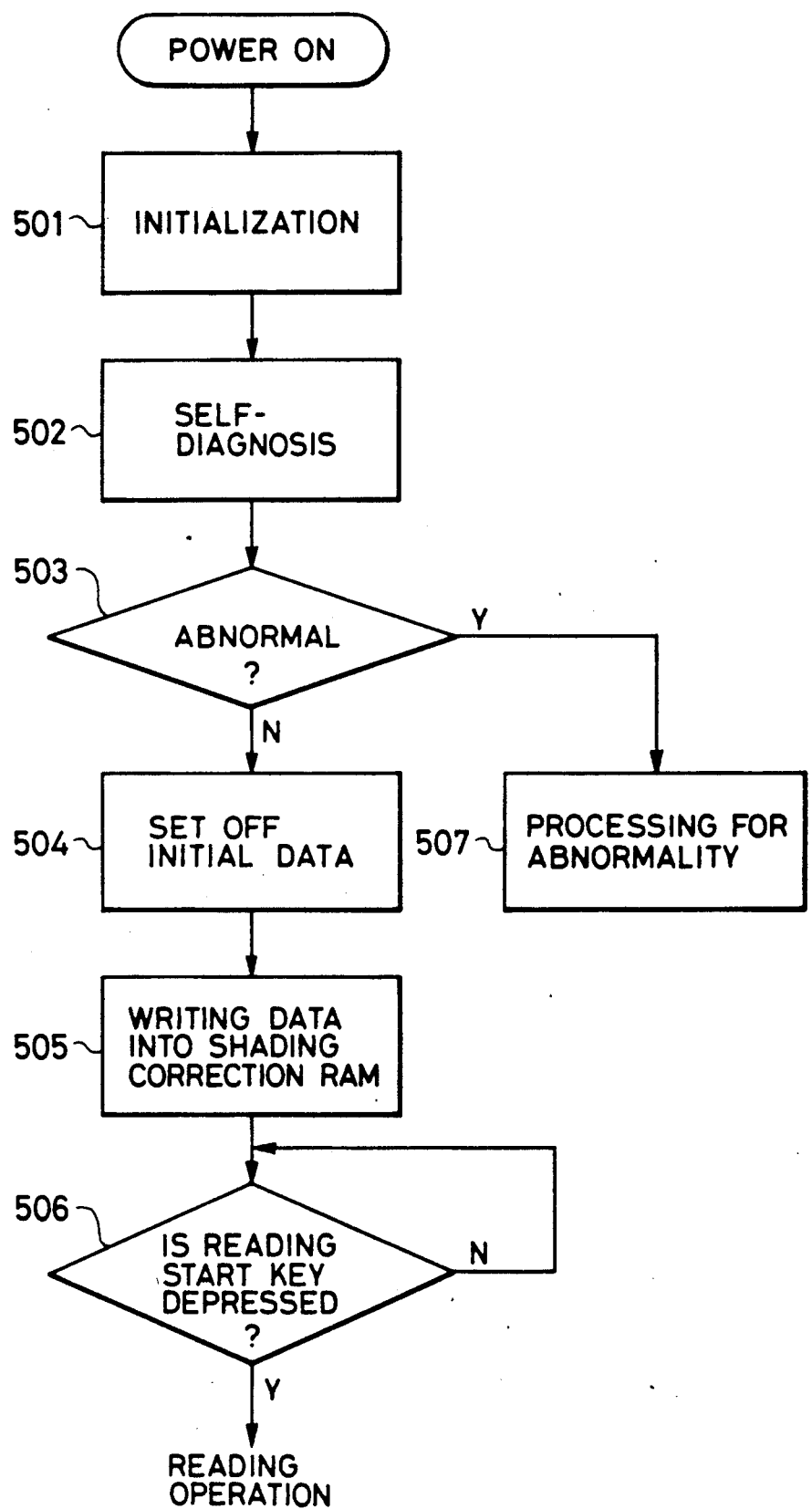
FIG. 6, 7A, and 7B are flowcharts showing an operating procedure of a CPU.
Figure 7A:
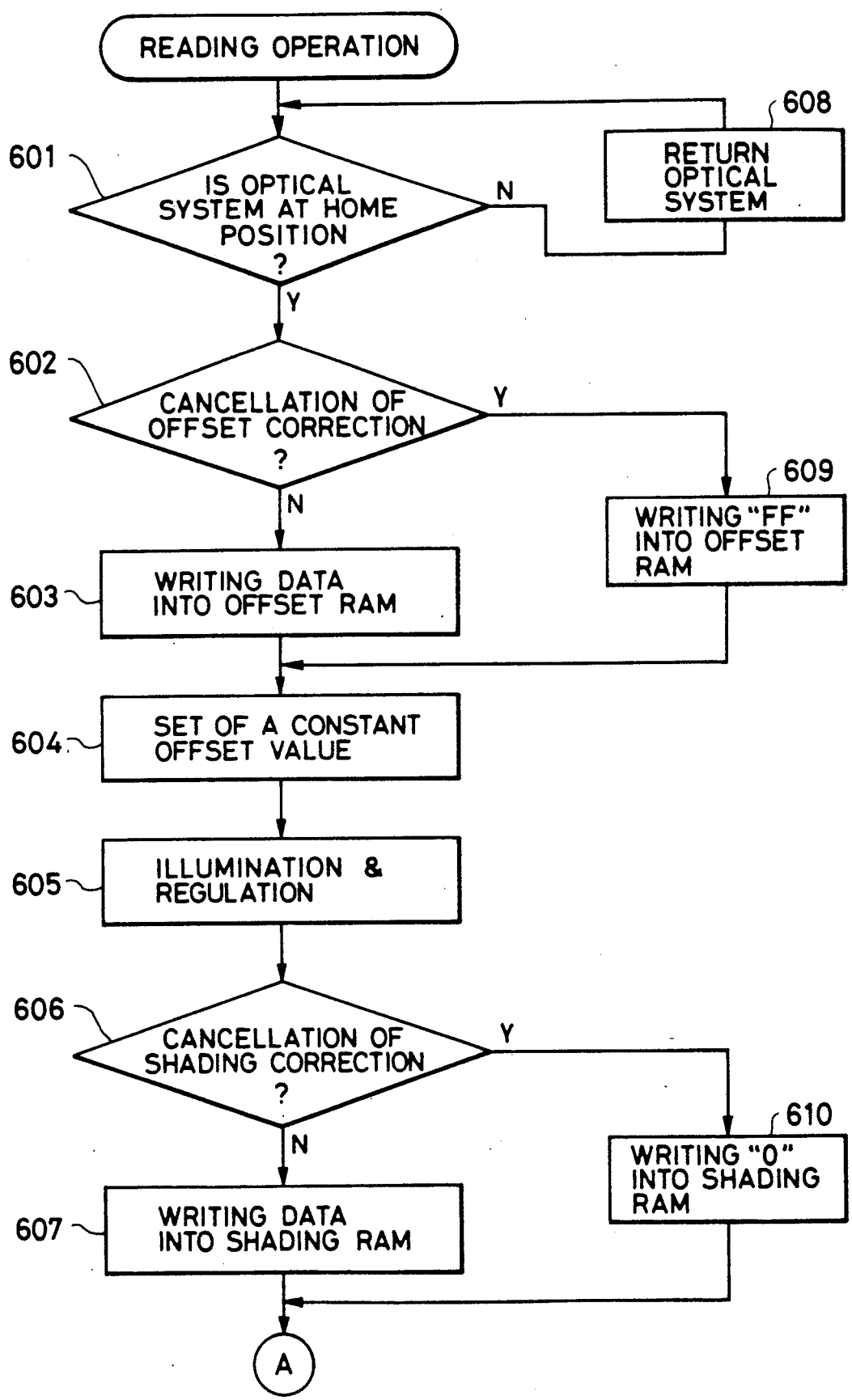
Figure 7B:
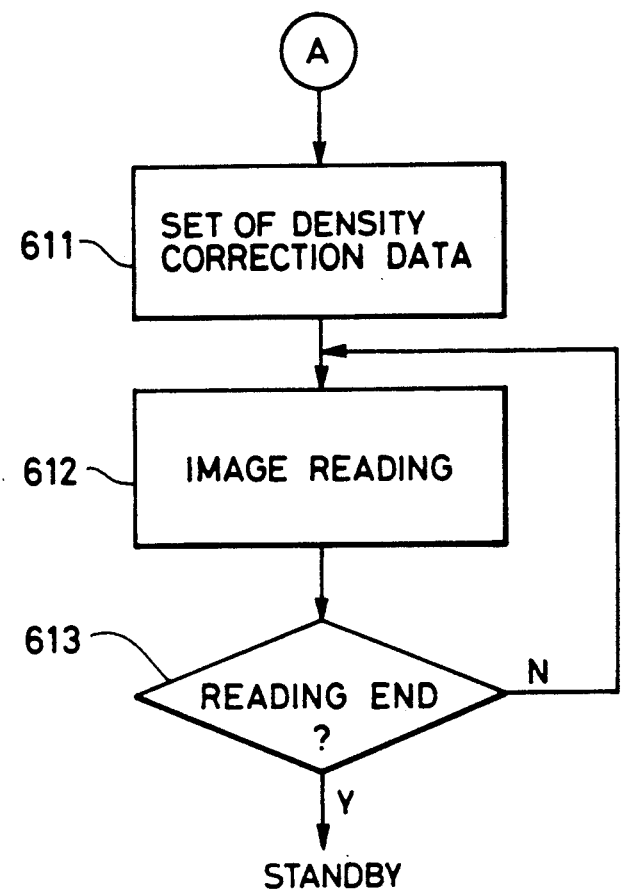

FIGS. 6, 7A, and 7B show an operating procedure of the CPU 212. This operating procedure is previously stored as a program into a ROM of the microcomputer.

When the power supply is turned on, the CPU 212 initializes the I/O port and clears the RAM (step 501). Next, by writing and reading test patterns into and from RAMs 311, 403, and 408, which will be explained hereinafter, the self-diagnosis is executed (step 502). After it was confirmed that no abnormality occurs (step 503), the initial data necessary to read an image is set (step 504).

If an abnormality found, the occurrence of the abnormality is indicated by an indicator and the abnormal position is displayed (step 507).

Figure 3:
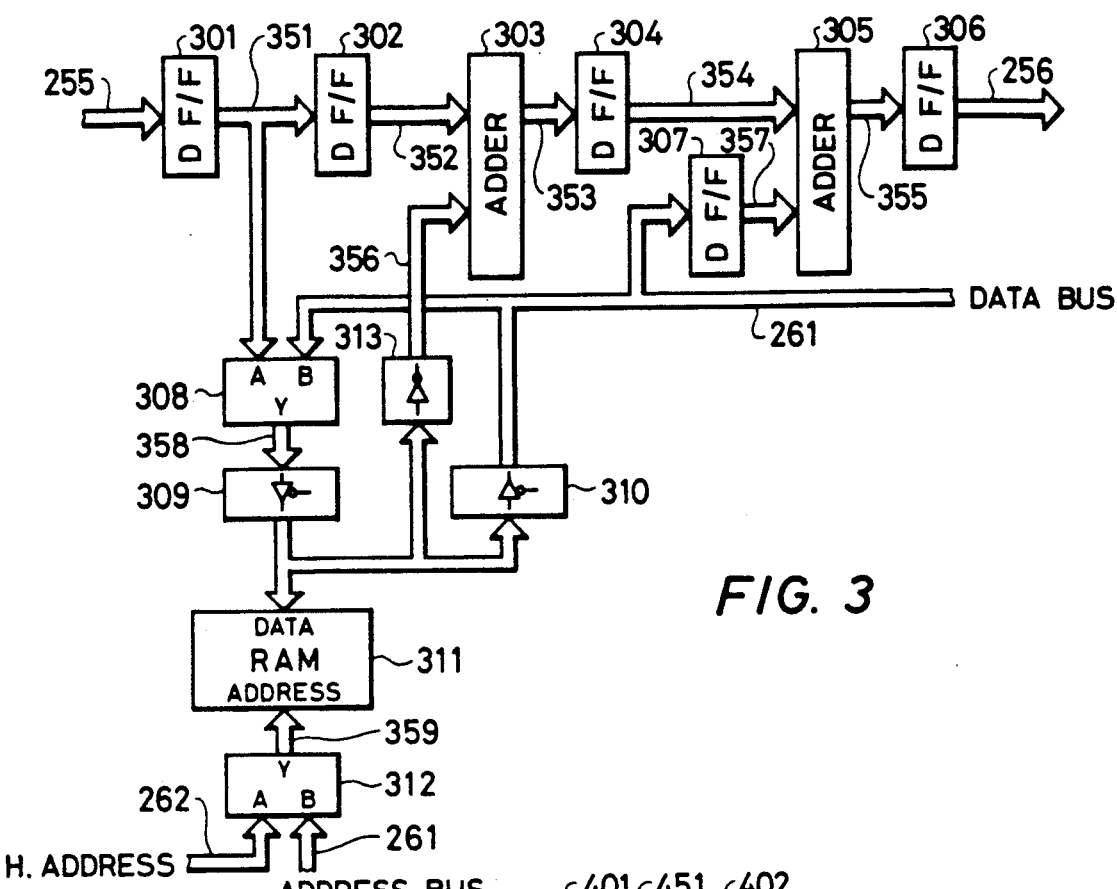
FIG. 3 is a block diagram showing a construction of an offset correction circuit shown in FIG. 2.

FIG. 3 shows a detailed construction of the offset correction circuit 205. Reference numerals 301, 302, 304, and 306 denote D-type flip-flops (D F/F) which are provided to adjust the timing of the data. When the processing speed of the circuit is slow, some of them can be also omitted.

The operation of the circuit shown in FIG. 3 will now be explained in accordance with the flowcharts of FIGS. 7A and 7B.

When a reading start key (not shown) provided in the operation unit 213 is pressed by the operator, the CPU 212 discriminates whether the optical system (consisting of the fluorescent lamp 104 and mirrors 105 to 107) is at the home position or not (step 601). If the answer is NO, the optical system is returned to the home position (step 608). Then, the data in the RAM of the CPU 212 is searched to see if the cancellation of the offset correction has been set or not (step 602). Before the reading operation is performed, the service person or the like switches the operating mode to the test mode and operates the operation unit 213 to thereby set the cancellation of the offset correction.

If the cancellation of the offset correction is not set, the CPU 212 instructs the offset RAM 311 to write the output data of the A/D converter 204 (step 603). Thus, the reading operation is performed by the CCD 103 in the state in which the fluorescent lamp 104 is not lit. The read-out image data is output to a signal line 351 through the A/D converter 204, signal line 255, and D F/F 301. The image data is given to the offset RAM 311 through a signal line 358 by a selector 308 which was switched to A. A selector 312 of an address of the RAM 311 is also switched to A. Thus, the image data at dark of each pixel of one line is written into the RAM 311 in accordance with the address 262 from the driving signal generator 211.

The reason why the fluorescent lamp is turned off at the home position is to reproduce the true black state by eliminating the influence of the outside light.

Next, the CPU 212 sets a constant offset value into a D F/F 307 (step 604). In this case, the data is latched into the D F/F 307 by the data bus 261 of the CPU 212 and the latched data in the D F/F 307 is added as an offset to the image data of a signal line 354. This circuit is provided to change the density reproducibility of the black level. For example, it is adjusted in a manner such that the density above 2.0 is set to complete black, or the density above 1.2 is set to complete black, or the like. The black level can be adjusted in accordance with the original density. On the other hand, if a circuit constant is changed due to the temperature and the original density is changed, the amount of change can be corrected for by this circuit.

The output of an output control buffer 309 is set to a high impedance and the output data of the selector 308 is disconnected, thereby allowing the data to be read out of the offset RAM 311. In this manner, the preparation of the operation by the offset correction circuit 205 is completed.

The image data which is newly input from the CCD 103 after that is input to an adder 303 by a signal line 352 through the D F/F 301 and 302. On the other hand, the dark-output data of the same pixel as the input image is read out of the RAM 311 synchronously with the input of the image data. The read-out dark-output data at dark is inverted by an inverter 313 and thereafter, it is input to the adder 303 through a signal line 356. Thus, the offset (dark voltage) is corrected every pixel. For example, the signal of eight bits is produced as image data and A/D converted such that black is set to $FF_H$ and white is set to $OO_H$. In this case, if the data of the nth pixel at dark stored in the offset RAM 311 has the value of $F3_H$, $OC_H$ as the inverted data of $F3_H$ is given to the adder 303 through the signal line 356. At the same time, the image data which is set to $F3_H$ in the black state and is set to $OO_H$ in the white state is given to the image signal line 352. Therefore, as the result of the addition by the adder 303, the data is converted into the data such that black is set to $FF_H$ and white is set to $OC_H$. The image data which was data converted in this manner is sent to the D F/F 304 through a signal line 353. This image data is further input to an adder 305 through the signal line 354.

As mentioned above, the adder 305 further adds the value which was instructed by the CPU 212 and latched in the D F/F 307 to the output data of the adder 303 as mentioned above. The image data which was converted as mentioned above ought to be transmitted from the D F/F 304 to the adder 305 in such a manner that true black is set to $FF_H$ and true white is set to $OC_H$. However, the actual original image is not in the true black state but has a certain density. Therefore, for example, when the maximum black level of an original is $FO_H$, $OF_H$ is added to the image data by an instruction from the CPU 212. Thus, the maximum black level of the original is corrected to $FF_H$ and the black density corresponding to the original image is derived. However, even when the adders 305 and 303 perform any addition, the resultant data does not over $FF_H$. If the results of the addition exceed $FF_H$, all of them are set to $FF_H$. As described above, the offset correction of the black level of the image data is performed. The corrected data is output to a signal line 256 through a signal line 355 and through the D F/F 306.

As described above, the addition data which is given to the adder 305 is supplied from the CPU 212. A method of forming this addition data will now be explained hereinbelow.

The reflection black density of an original largely differs in dependence on the kind of original (e.g., the kind of photograph print, surface process, or the like). Therefore, there occurs a case where even the complete black portion is not reproduced as a black image in dependence on the original. On the contrary, when a slightly weak black portion is set to a black image, in the case of the original having a thick black density, the density gradation of the black portion deteriorates. To prevent this drawback, the image signal is set to $FF_H$ when it is true black and the addition value is input from the operation unit in accordance with the black density of the original. For example, as mentioned above, when the black level of the original is $FO_H$, the addition value of $OF_H$ is added. Thus, the black portion of the original can be read as a black image.

On the other hand, there is a case where even in the same original, the resultant black level varies in association with a temperature change in the clamping circuit or amplifier. For example, if the black level which was set to $FO_H$ at 0° C. is changed to $EC_H$ at 10° C., the level varies by about four levels per 10° C. In such a case, the atmospheric temperature is detected and the addition value is changed at the rate of 4 levels/10° C. Thus, the density change resulting from variations the temperature can be eliminated.

A plurality of kinds of addition values are previously stored into the memory ROM and these values are selected in response to an instruction from the operation unit or on the basis of the result of the detected temperature. A similar level shifting operation can be also performed by the substracting operation in place of the adding operation.

When the foregoing cancellation of the offset correction was set, $FF_H$ is written into the offset RAM 311 with respect to all of the pixels of one line (step 609). Thus, the output of the adder 303 is equal to the input data of the D F/F 302. The data which is not subjected to the offset correction can be obtained for the input image data.

Figure 4:
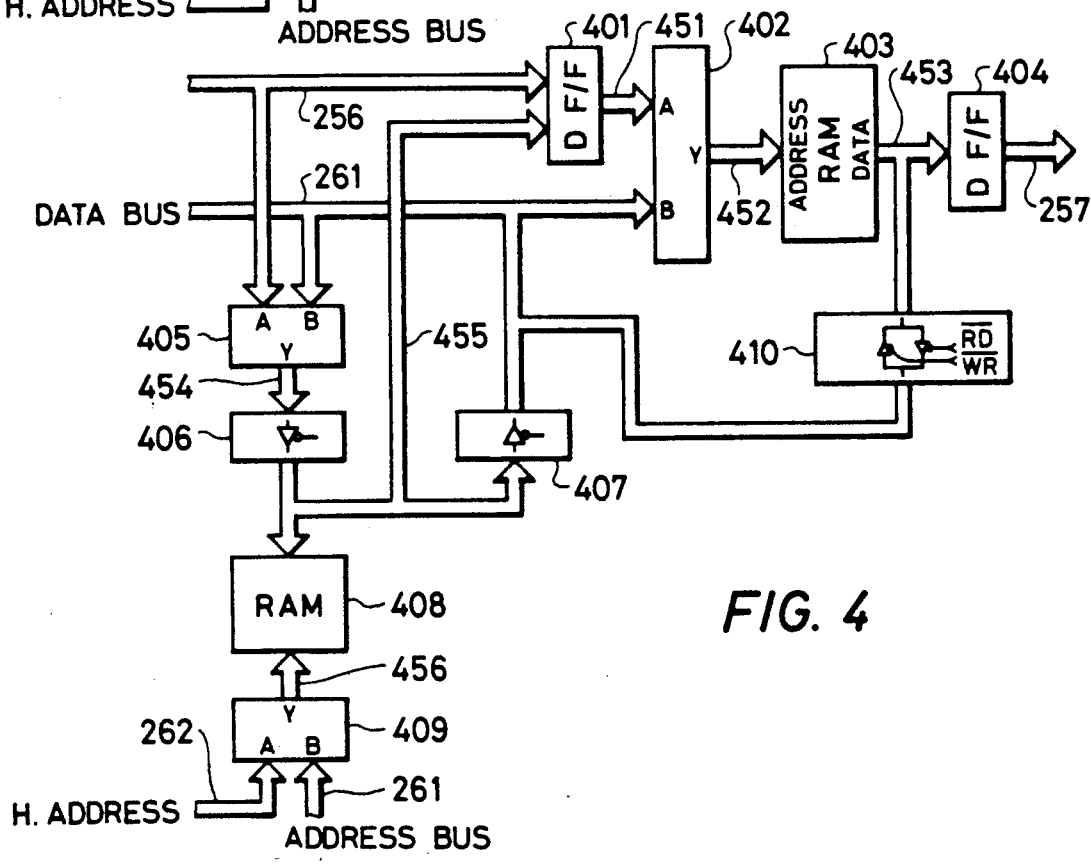
FIG. 4 is a block diagram showing a construction of a shading correction circuit shown in FIG. 2.

The image data whose black level has been corrected by the offset correction circuit 205 is input to the shading correction circuit 206 and processed. A circuit constitution of the shading correction circuit 206 is shown in FIG. 4. The operation of the circuit shown in FIG. 4 will now be explained with reference to FIGS. 6, 7A and 7B.

The shading correction data is input to the shading correction RAM 403. After the power supply is turned on, a selector 402 is switched to B by the CPU 212 before the reading operation of the original image is started. The conversion data, which will be explained hereinafter, is written into the RAM 403 through an I/O buffer 410 (step 505).

After completion of the preparing operation for the foregoing offset correction after the reading start key has been pressed, the fluorescent lamp 104 is turned on and its illumination light amount is regulated so as to become a constant light amount (step 605). Next, a check is made to see if the cancellation of the shading correction has been set or not (S606). If the answer is NO, selectors 405 and 409 are set to A. In this state, the lamp 104 illuminates the reference white plate 111 at the home position to thereby read the plate 111 by the CCD 103. The data which is offset corrected by the offset correction circuit 205 and is input from the signal line 256, is written through the selector 405 into the shading RAM 408 by an amount of all pixels of one line in response to a designated address from the driving signal generator 211 (step 607).

Next, an output buffer 406 is set to a high impedance, the output of the selector 405 to a signal line 454 is disconnected, and the shading RAM 408 is set into the reading mode. In this manner, the preparing operation of the shading correction by the shading correction circuit 206 is completed. Thereafter, the image data indicative of the original image which is newly input from the CCD 102 is input from a D F/F 401 into addresses $A_0$ to $A_7$ in the shading correction RAM 403 through a signal line 451 and the selector 402. The shading data of the same pixel as the pixel of the input image data is read out of the shading RAM 408. The shading data is transmitted through a signal line 455 to the D F/F 401 and then sent through the signal line 451 to the selector 402 and input into addresses $A_8$ to $A_{12}$ in the shading correction RAM 403. At this time, upper three bits of the data in the RAM 403 are not used. The corrected data is sent from the RAM 403 through a signal line 453 in accordance with this address and is output to a signal line 257 through a D F/F 404.

As mentioned above, in step 505 before the reading operation is started after the power supply was turned on, the value calculated by the CPU 212 in accordance with the expression $$y = \frac{255}{255 - z} X (x - z)$$

is set as a table into the shading correction RAM 403 so as to output the data of y in which x and z are used as addresses. x denotes image data, z is shading data, and y is corrected data.

For example, when the reference white plate 111 was illuminated, if the nth pixel data stored in the RAM 408 is $OC_H$, $OCXX_H$ (XX denotes image data which is input at present) is given into the address in the RAM 403. Since the image data which is input to the RAM 403 falls within a range of $OC_H$ to $FF_H$ due to the offset correction. Therefore, the output data of the RAM 403 is as shown in the following table with respect to each image data which is input.

TABLE

| Input (x) | Output (y) |
| --- | --- |
| $OC_H$ | $00_H$ |
| $OD_H$ | $01_H$ |
| $OE_H$ | $02_H$ |
| $30_H$ | $25_H$ |
| $50_H$ | $47_H$ |
| $AO_H$ | $9B_H$ |
| $FE_H$ | $FE_H$ |
| $FF_H$ | $FF_H$ |

Shading data: 0CH

Therefore, such a table as shown in the above table is written in the RAM 403 by the CPU 212. Thus, even if the sensitivities of the respective pixels of the CCD 103 are not uniform, the output data is uniformed every pixel within a range of 0 to $FF_H$.

Figure 5:
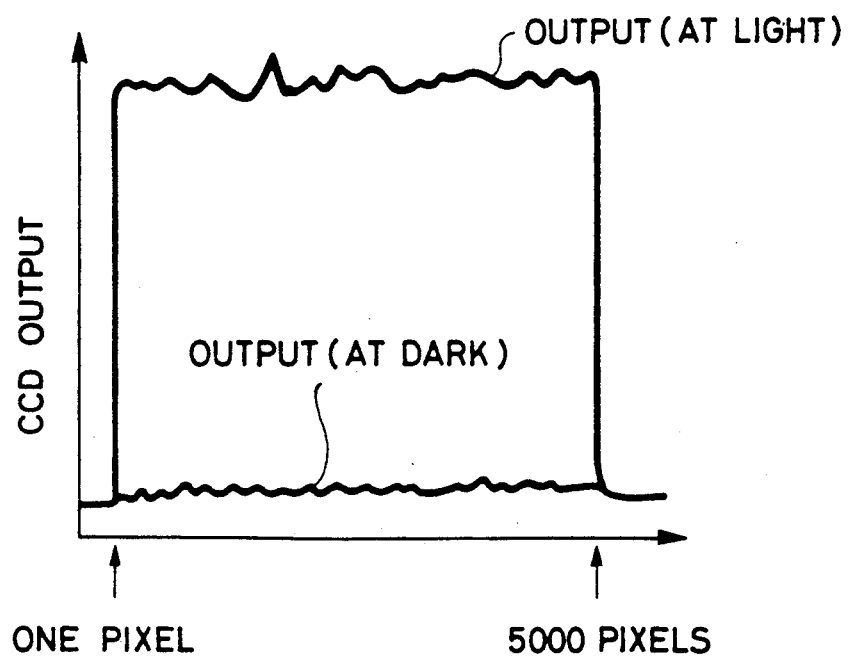
FIG. 5 is a diagram showing an output of a CCD.

As described above, the unevenness of the outputs of the CCD 103 which is caused by a variation in dark voltage which appears at dark as shown in FIG. 5 can be corrected by the offset correction circuit 205 and shading correction circuit 206. The unevenness of the outputs of the CCD 103 which is caused due to a sensitivity variation and a dark voltage variation which appear at light can be also corrected by those correction circuits. Thus, the uniform output which accurately corresponds to the density of the original is derived.

If the cancellation of the shading correction has been set, "0" data is written into the shading RAM 408 (step 610). Thus, the image data which is not subjected to the shading correction can be obtained.

The image data which was linearly corrected for the reflected light amount of the original as described above and appeared on the signal line 257 is input to the γ correction circuit 207 and converted into the image data which is linear for the density. By designating a density by means of the operation unit 213, the density conversion characteristic (curve) can be changed (step 611).

After completion of the preparation of the operations for the offset correction, shading correction, and γ correction as described above, the optical system is moved in the y direction from the home position and the image of the original set on the original base 101 is read by the CCD 103 (step 612). As mentioned above, the read-out image data is subjected to the offset correction, shading correction, and density correction and the corrected data is output through the buffer memory 208 to the printer 209.

After completion of the image reading operation, the apparatus is set into the standby mode (step 613) and the apparatus waits until a new image is read.

As described above, in the state in which no light enters the image sensor (CCD) to read an image, the CCD 103 is driven and a fluctuation of the output of the CCD 103 of each pixel at that time is detected, thereby correcting the image data. Thus, the unevenness of the image data of the respective pixels due to a variation of the dark voltages of the respective photo-sensing elements of the CCD 103 can be corrected and the black level of the image can be set to a preferable level.

On the other hand, since the shading correction is performed using the image data whose dark voltage was corrected, the shading which is caused due to a variation of sensitivities of the photo-sensing elements of the CCD 103 or the like can be preferably corrected without being influenced by the dark voltage.

In addition, since the black level is shifted after the dark voltage is corrected, the image data having a desired black level can be derived.

As described above, according to the first embodiment, the unevenness of the image data which is obtained by photoelectrically reading the image on the basis of the read-out data at dark can be corrected and the preferable image can be reproduced.

In the foregoing embodiment, the output of the CCD 103 in the state in which the fluorescent lamp was lit off has been used to correct the black level. However, in place of this method, by reading a reference black image is read by the CCD 103, the unevenness of the black level of the output of the CCD 103 is recognized, thereby enabling the black level to be also corrected.

A construction such that the black level is corrected on the basis of the output derived by reading the reference black image by the CCD 103 will now be explained hereinbelow as the second embodiment of the invention.

Figure 8:
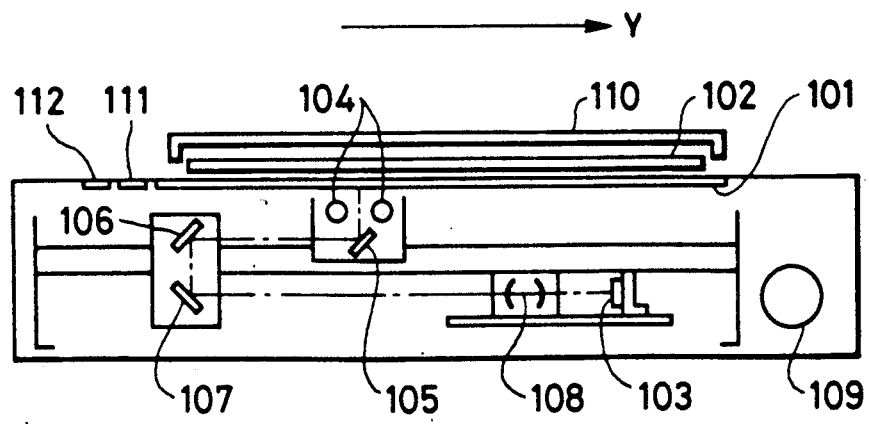
FIG. 8 is a diagram showing a construction of an image reading apparatus in the second embodiment to which the invention is applied.

FIG. 8 shows the second embodiment of an image reading apparatus to which the present invention is applied. The same parts and components as those shown in FIG. 1 are designated by the same reference numerals. Namely, reference numeral 101 denotes the original base; 102 is the original pressing plate; 103 the image reading CCD consisting of a plurality of photo-sensing elements arranged in a line; 104 the fluorescent lamp to illuminate an original; 105 to 107 the mirrors; 108 the lens to form an image; and 109 the motor. The original image is sub-scanned in the Y direction by moving the lamp 104 and mirrors 105 to 107 by means of the motor 109, thereby sequentially forming original images onto the CCD 103. The reference white plate 111 is provided to obtain the data for the shading correction. The fluorescent lamp 104 and mirrors 105 to 107 are arranged at the position such that the lamp 104 illuminates the reference white plate 111 and the reflected lights from the plate 111 are led to the CCD 103. This state is called a home position 2. A reference black plate 112 is also provided to obtain the data for the black level correction. The position at which the light reflected from the reference black plate 112 is led to the CCD 103 is called the home position 1.

The image reading apparatus shown in FIG. 8 can be constructed in substantially the same manner as the circuit constructed of FIGS. 2 to 4 shown in conjunction with the image reading apparatus shown in FIG. 1. Therefore, FIGS. 2 to 4 can be also used and their detailed descriptions are omitted. Namely, the construction of the control circuit in the second embodiment is almost the same as that in the first embodiment except that the control program of the CPU 12 slightly differs.

Therefore, the operation in the case where the circuit constructions of FIGS. 2 to 4 are applied to the second embodiment will be explained.

FIG. 9 shows an operating procedure of the CPU 212 and this operating procedure is preliminarily stored as a program into the ROM of the microcomputer.

Figure 9A:
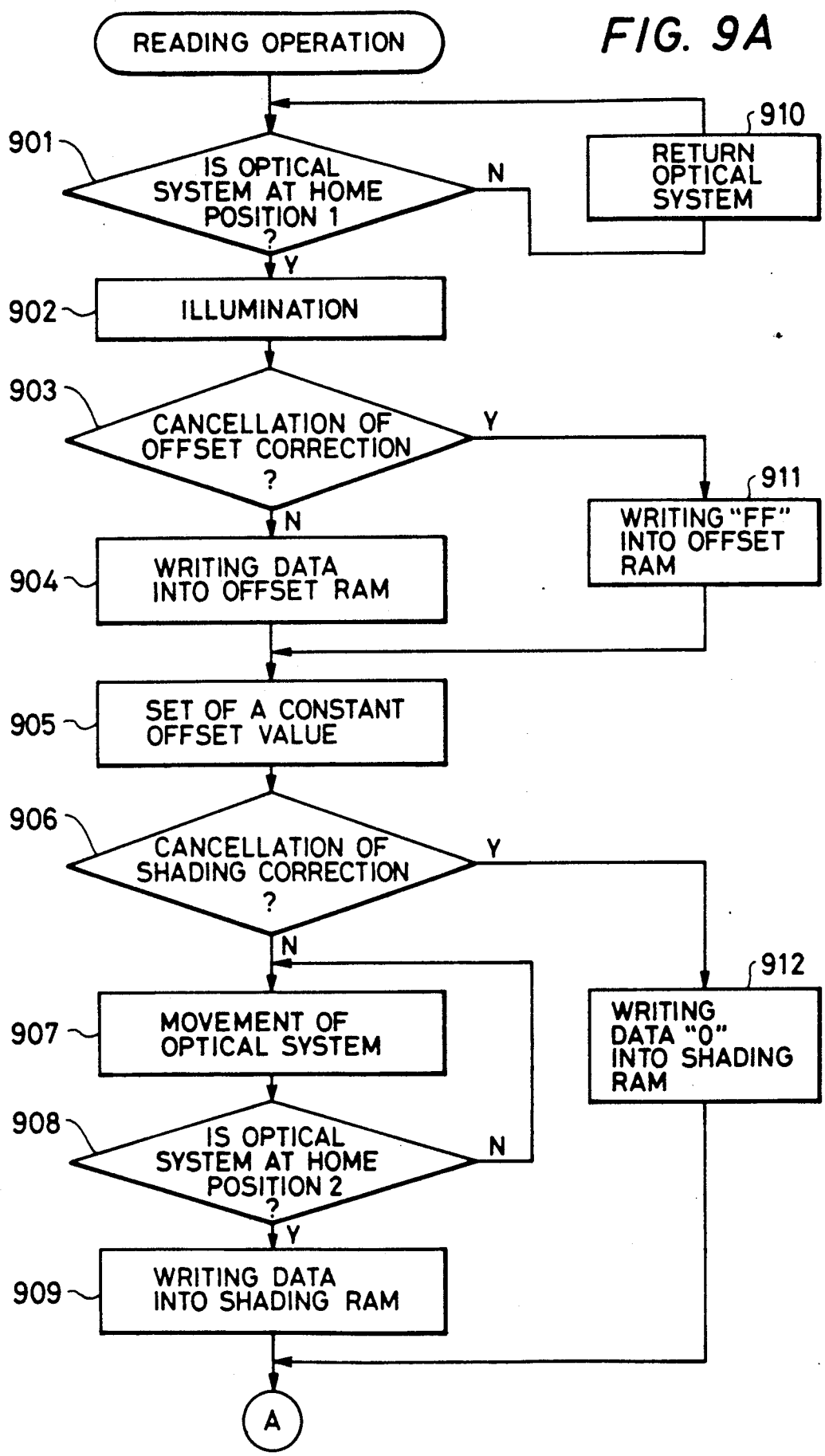
FIGS. 9A and 9B are flowcharts showing an operating procedure of the image reading apparatus shown in FIG. 8.
Figure 9B:
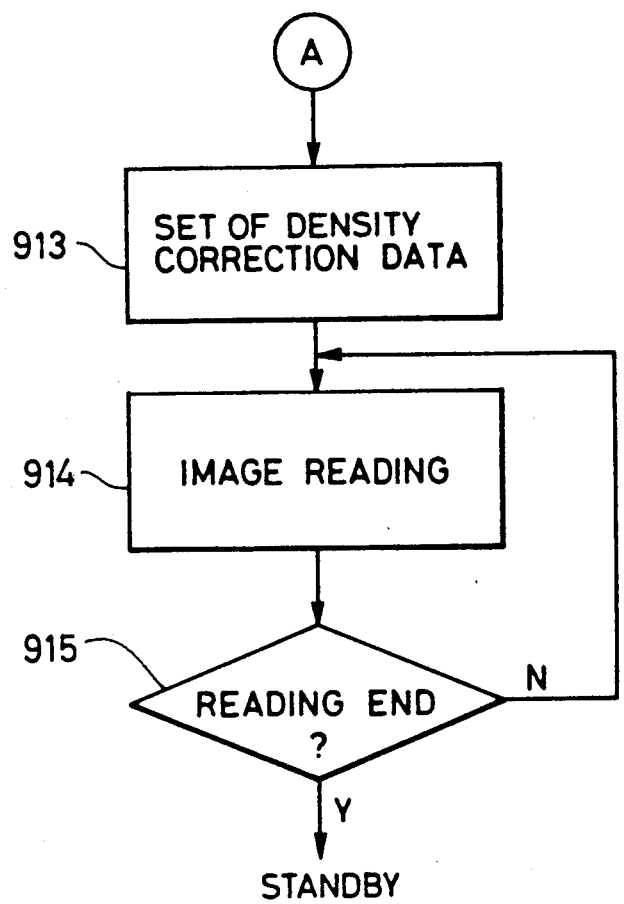

The operation of the circuit in the second embodiment will be explained with reference to flowcharts of FIGS. 9A and 9B.

When the reading start key in the operation unit is pressed, the CPU 212 checks to see if the optical system (fluorescent lamp 104 and mirrors 105 to 107) has reached the foregoing home position 1 or not (step 901). If NO, the optical system is returned to the home position 1 (step 910). The illumination is turned on (step 902). If the optical system has reached the home position 1, the image of the reference black plate 112 is formed onto the CCD 103.

The content of the data in the RAM of the CPU 212 is searched to see if the cancellation of the offset correction has been set or not (step 903). Before the reading operation is performed, the service man or the like switches the operating mode to the test mode and operates the operation unit 213 to thereby set the cancellation of the offset correction.

If the cancellation of the offset correction is not set, the CPU 212 instructs to write the read image data of the reference black plate 112 into the offset RAM 311 (step 904). Thus, the CCD 103 reads the image of the plate 112 illuminated by the lamp 104. The resultant image data is transmitted through the A/D converter 204, signal line 255, and D F/F 301 and output to the signal line 351. The image data is given through the signal line 358 to the offset RAM 311 by the selector 308 which has been switched to A. The selector 312 of the address in the RAM 311 is also switched to A. The image data at dark of each pixel of one line is written into the RAM 311 in accordance with the address from the driving signal generator 211.

Next, the CPU 212 sets a constant offset value into the D F/F 307 (step 905). The data is latched into the D F/F 307 through the data bus 261 of the CPU 212. The data latched in the D F/F 307 is added as an offset to the image data on the signal line 354 similarly to the first embodiment.

The output of the output control buffer 309 is set to a high impedance to disconnect the output data of the selector 308. The data is read out of the offset RAM 311. The preparation of the operation by the offset correction circuit 205 is completed in this manner.

The image data which is newly input from the CCD 103 after that is transmitted through the D F/F 301 and 302 and input to the adder 303 through the signal line 352. On the other hand, the output data at dark of the same pixel as the input image is read out of the RAM 311 synchronously with the input of the image data. The read-out output data at dark is inverted by the inverter 313. Thereafter, it is input to the adder 303 through the signal line 356. Thus, the offset (dark voltage) is corrected every pixel on the basis of the read-out data of the reference black plate 112. For example, the signal of eight bits is produced as image data and A/D converted such that black is set to $FF_H$ and white is set to $OO_H$. If the data of the nth pixel in the read-out data of the plate 112 at dark, which data has been stored in the offset RAM 311, has a value of $F3_H$, $OC_H$ as the inverted data of $F3_H$ is given to the adder 303 through the signal line 356. Simultaneously, the image data which is set to $F3_H$ in the black state and $OO_H$ in the white state is given to the image signal line 352. Therefore, as the result of the addition by the adder 303, the data is converted into such data that black is set to $FF_H$ and white is set to $OC_H$. This data is sent to the D F/F 304 through the signal line 353 and further input to the adder 305 through the signal line 354.

As mentioned above, the addition data which is given to the adder 305 is supplied from the CPU 212. A method of producing this addition data will now be explained hereinbelow.

The reflection black density of the original largely differs in dependence on the kinds of original (e.g., the kind of photograph printing, surface processing, and the like). Therefore, there occurs a case where even the complete black portion is not reproduced as a black image in dependence on the original. On the contrary, if a slightly weak portion is set to black, in the case of the original having a thick black density, the density gradation of the black portion deteriorates. To eliminate such a drawback, the image signal is set to $FF_H$ in the case of the true black portion and an addition value is input from the operation unit in accordance with the black density of the original. For example, if the black level of the original is set to $FO_H$, the addition value $F_H$ is added. Thus, the black portion of the original is read as a black image.

As another function, when the density of the reference black plate 112 differs from the actual black, the amount of this difference is input from the operation unit and this value can be added. Therefore, even if the densities of the reference black plates 112 of respective machines differ, by inputting the correction data, the influence by the variation in density of the reference black plate can be eliminated.

In addition, in association with changes in temperatures of the clamping circuit and amplifier, the black level which is obtained from the same original varies. For example, when the black level which was set to $FO_H$ at 0° C. changes to $FC_H$ at 10° C., the level changes by about four levels per 10° C. In such a case, the atmospheric temperature is detected and the addition value is changed at the ratio of 4 levels/10° C. In this manner, density change due to variations in the temperature can be removed.

A plurality of kinds of addition values are previously stored into the ROM and are selected in response to a command from the operation unit or on the basis of the result of the detected temperature. On the other hand, in place of the adding operation, the similar level shifting operation can be realized by the subtracting operation.

If the foregoing cancellation of the offset correction has been set, $FF_H$ is written into the offset RAM 311 (step 911). Thus, the data which is not subjected to the offset correction can be derived for the input image data.

The image data whose black level is corrected on the basis of the read-out data of the reference black plate 112 as described above is input to the shading correction circuit 206 and processed. The operation of the shading correction circuit 206 will be explained with reference to FIGS. 9A and 9B.

The shading correction data is input to the shading correction RAM 403. The selector 402 is switched to B by the CPU 212 before the reading operation of an original image is started after the power supply was turned on. Conversion data, which will be explained hereinafter, is written in the RAM 403 through the I/O buffer 410 (step 505 in FIG. 6).

After completion of the preparing operation for the offset correction as mentioned above after the reading start key had been pressed, the optical system is moved to the home position 2 (steps 907 and 908). When the optical system is at the home position 2, the reference white plate 111 is illuminated by the fluorescent lamp 104 and an image is formed onto the CCD 103.

Before step 907, a check is made to see if the cancellation of the shading correction has been set or not (step 907). If NO, the selectors 405 and 409 are set to A. In this state, the lamp 104 illuminates the reference white plate 111 at the home position thereby to read the image of the plate 111 by the CCD 103. The data which was offset corrected by the offset correction circuit 205 on the basis of the read-out data of the reference black plate 112 is input by the signal line 256. This data is written into the shading RAM 408 by an amount of all pixels of one line through the selector 405 in response to the designated address from the driving signal generator 211 (step 909).

Next, the output buffer 406 is set to a high impedance to disconnect the output of the selector 405 to the signal line 454. At the same time, the shading RAM 408 is set into the reading mode. Thus, the preparing operation of the shading correction by the shading correction circuit 206 is completed. The image data indicative of the original image which is newly input from the CCD 103 after that is transmitted from the D F/F 401 through the signal line 451 to the selector 402. The image data is then output from the selector 402 and input to the addresses $A_0$ to $A_7$ in the shading correction RAM 403. The shading data of the same pixel as the pixel of the input image data is read out of the shading RAM 408. The shading data is input to the D F/F 401 by the signal line 455 and then transmitted through the signal line 451 to the selector 402 and input to the addresses $A_8$ to $A_{12}$ in the shading correction RAM 403. The upper three bits of the data in the RAM 403 are not used. The corrected data is output from the RAM 403 in accordance with those addresses and transmitted through the signal line 453 and D F/F 404 to the signal line 257.

Before the reading operation is started after the power supply is turned on, the values calculated by the CPU 212 on the basis of the expression $$y = \frac{255}{255 - z} X (x - z)$$

are set as a table into the shading correction RAM 403 in a manner such that the data of y is output in which x and z are used as addresses as previously explained. x denotes the image data, z is the shading data, and y is the corrected data. Thus, even if the sensitivities of the photo-sensing elements of the CCD are not uniform, the output data can be uniformed within a range of 0 to $FF_H$ every pixel.

As described above, with the construction of the second embodiment, the unevenness of the outputs of the CCD 103 which is caused due to a variation in dark voltage which appears at dark as shown in FIG. 5 can be corrected by the offset correction circuit 205 and shading correction circuit 206 similarly to the first embodiment. Also, the unevenness of the outputs of the CCD 103 which is caused due to variations in sensitivity and dark voltage which appear at light can be also corrected by those correction circuits 205 and 206. Thus, the uniform output which accurately corresponds to the original density is obtained.

If the cancellation of the shading correction has been set, "0" data is written into the shading RAM 408 (step 912). Thus, the image data which is not subjected to the shading correction can be derived.

As described above, the image data which has been linearly corrected for the reflected light amount of the original and appears on the signal line 257 is input to the γ correction circuit 207 and converted into the image data which is linear with respect to the density. On the other hand, the characteristic (curve) for density conversion can be changed by designating a desired density by the operation unit 213 (step 913).

After completion of the preparation of the operations for the offset correction, shading correction, and γ correction as described above, the optical system is moved in the Y direction and the image of the original set on the original base 101 is read by the CCD 103 (step 914). The read-out image data is subjected to the offset correction, shading correction, and density correction as mentioned above. The corrected data is output to the printer 209 through the buffer memory 208.

After completion of the image reading operation, the apparatus is set to the standby mode (step 915) and the apparatus waits until an image data is newly read.

The CCD 103 is driven in the state in which the light reflected from the reference black plate 112 has been input to the image reading sensor (CCD) as described above. A variation of the outputs of the CCD 103 of the respective pixels at that time is detected, thereby correcting the image data. Thus, it is possible to correct the unevenness of the image data of each pixel due to a fluctuation of the output voltages of the respective photosensing elements of the CCD 103 to the reference black plate. The black level of the image can be set to a preferable level.

On the other hand, since the shading correction is performed using the image data whose black level was corrected, the shading which is caused by a fluctuation of the sensitivities of the respective photosensing elements of the CCD 103 or the like is corrected without being influenced by the dark voltage.

In addition, since the black level is shifted after the black level was corrected, the image data having a desired black level can be derived.

As described above, the unevenness of the image data which is derived by photoelectrically reading the image can be corrected on the basis of the read-out data of the reference black plate 112. A preferable image can be reproduced.

According to the construction of the first and second embodiments explained above, the output data at dark of the CCD 103 or the read-out data of the reference black plate has been stored by an amount of all pixels of one line in order to correct the black level, and the correcting operation has been executed every pixel on the basis of the stored data. However, in these construction, a memory having a large memory capacity is necessary as a RAM to store the black data. In addition, if the unevenness of the respective pixel levels of the CCD is small, there is no need to individually correct all pixels.

As the third embodiment of the invention, a construction in which the black level correction of the image data is simplified will now be explained.

Figure 10:
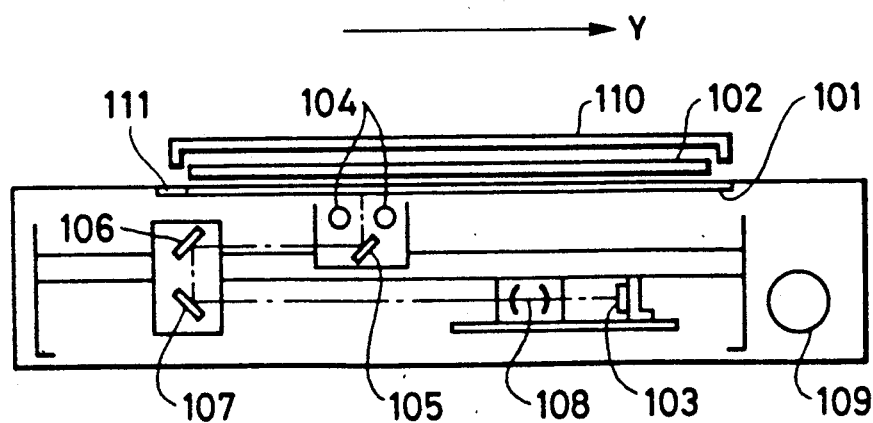
FIG. 10 is a diagram showing a construction of an image reading apparatus of the third embodiment to which the invention is applied.

FIG. 10 shows the third embodiment of an image reading apparatus to which the invention is applied. Reference numeral 101 denotes the original base; 102 is the original pressing plate; 103 the image reading CCD consisting of a plurality of photo-sensing elements arranged in a line; 104 the fluorescent lamp to illuminate the original; 105 to 107 the mirrors; 108 the lens to form an image; and 109 the motor. By moving the lamp 104 and mirrors 105 to 107 by the motor 109, the original is sub-scanned in the Y direction, thereby sequentially forming the original images onto the CCD 103. The reference white plate 111 is provided to obtain the data for the shading correction. The fluorescent lamp 104 and mirrors 105 to 107 are disposed at positions such that the lamp 104 illuminates the reference white plate 111 and the light reflected from the plate 111 is led to the CCD 103. This state is called the home position.

Figure 11:
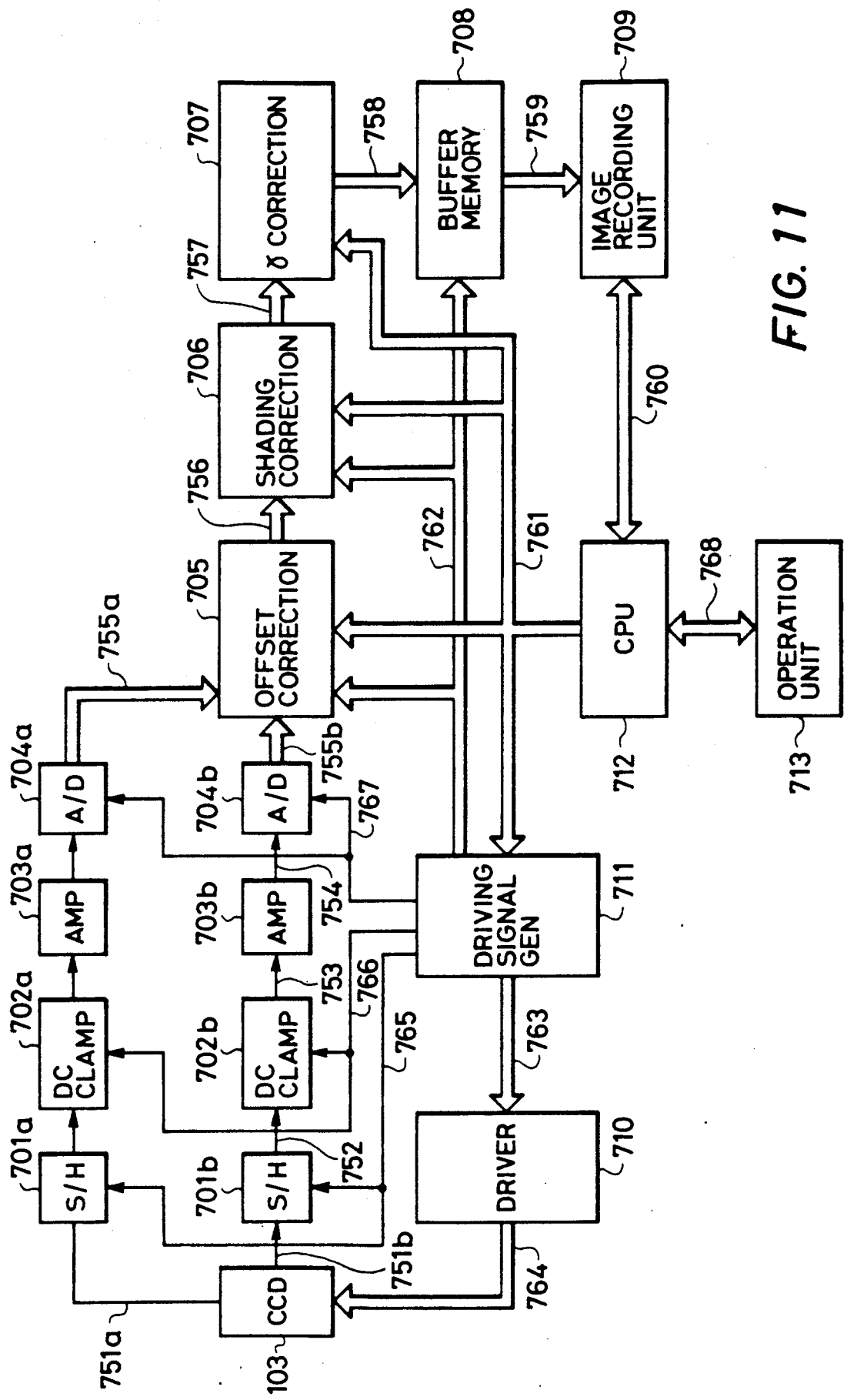
FIG. 11 is a block diagram showing a circuit construction of the image reading apparatus shown in FIG. 10.

FIG. 11 is a block diagram showing a circuit construction of the image reading apparatus of the third embodiment.

The CCD 103 (e.g., TCD106C made by Toshiba Corporation) is separately provided with outputs (751a and 751b) of two systems corresponding respectively to the even number pixels and odd number pixels, thereby enabling the signal processes to be performed independently. Each processing circuit for the even number pixels is indicated by a reference numeral to which a is added. Each processing circuit for the odd number pixels is indicated by a reference numeral to which b is added.

Since the signal processes of the even number pixels and odd number pixels are the same, the image processes for the output 751a corresponding to the even number pixels will be explained hereinbelow.

The noise component of the image signal derived by reading the image line by line by the CCD 103 is eliminated by a sample-and-hold circuit 701 in response to a timing signal 765, so that only the signal component is taken out. Further, the black level is reproduced by a DC clamping circuit 702. The output of the CCD 103 is taken out as a relative output for the black level. Therefore, by detecting the black level signal every line and by always keeping the black level constant (e.g., 0 V), the output of the CCD 103 is corrected to the absolute level. A signal 766 indicates a period of time when a black level signal is output from the CCD 103. The level corrected image signal is then amplified by an amplifier 703 to a signal level suitable for the A/D conversion. EF8308 (made by Tomson Co., Ltd.) is used as an A/D converter 704 in this embodiment. The A/D converter 704 converts the analog input of 0 to 2 V into the digital signals of 0 to $FF_H$. The white level output of the CCD 103 whose level was corrected is 0.3 V. Therefore, the amplifier 703 amplifies the white level output 6.6 times so as to be set into about 2 V. Although not shown, a circuit to always adjust the light amount of the fluorescent lamp 104 such that the white output level of the CCD 103 is set to 0.3 V is provided. An inverter is provided at an output terminal of the A/D converter 704. The image data which was A/D converted every pixel by the A/D converter 704 in response to a timing signal 767 is output to an image signal line 755 in a manner such that true white is set to "$00_H$" and true black is set to "$FF_H$".

The image data input to an offset correction circuit 705 is dark voltage corrected and further sent to a shading correction circuit 706 and sensitivity corrected.

The sensitivity corrected image data is supplied to a γ correction circuit 707. The γ correction circuit 707 is a RAM in which density conversion data is stored. A CPU 712 can write a desired conversion curve into this γ correction circuit by designating a desired density by the user or on the basis of the density characteristic of the recording unit.

A buffer memory 708 is provided to adjust the output speed of the image data in accordance with an image recording unit (printer) 709 when an image is recorded by the image recording unit 709. The buffer memory 708 has a memory capacity of the image data of two lines.

A driving signal generator 711 generates clocks necessary to drive the CCD 103 and also generates an address corresponding to each pixel position of the image of one line. By use of this address, each circuit can know from which position in the main scanning the input image data was obtained.

A driver 710 forms a signal 764 to drive the CCD 103 in response to various kinds of signals 763 from the driving signal generator 711.

The CPU 712 mainly consists of a microcomputer and controls an operation unit 713 and the printer 709. The CPU 712 also produces a control signal of each section by a data bus 761 and an address bus 761.

Figure 14:
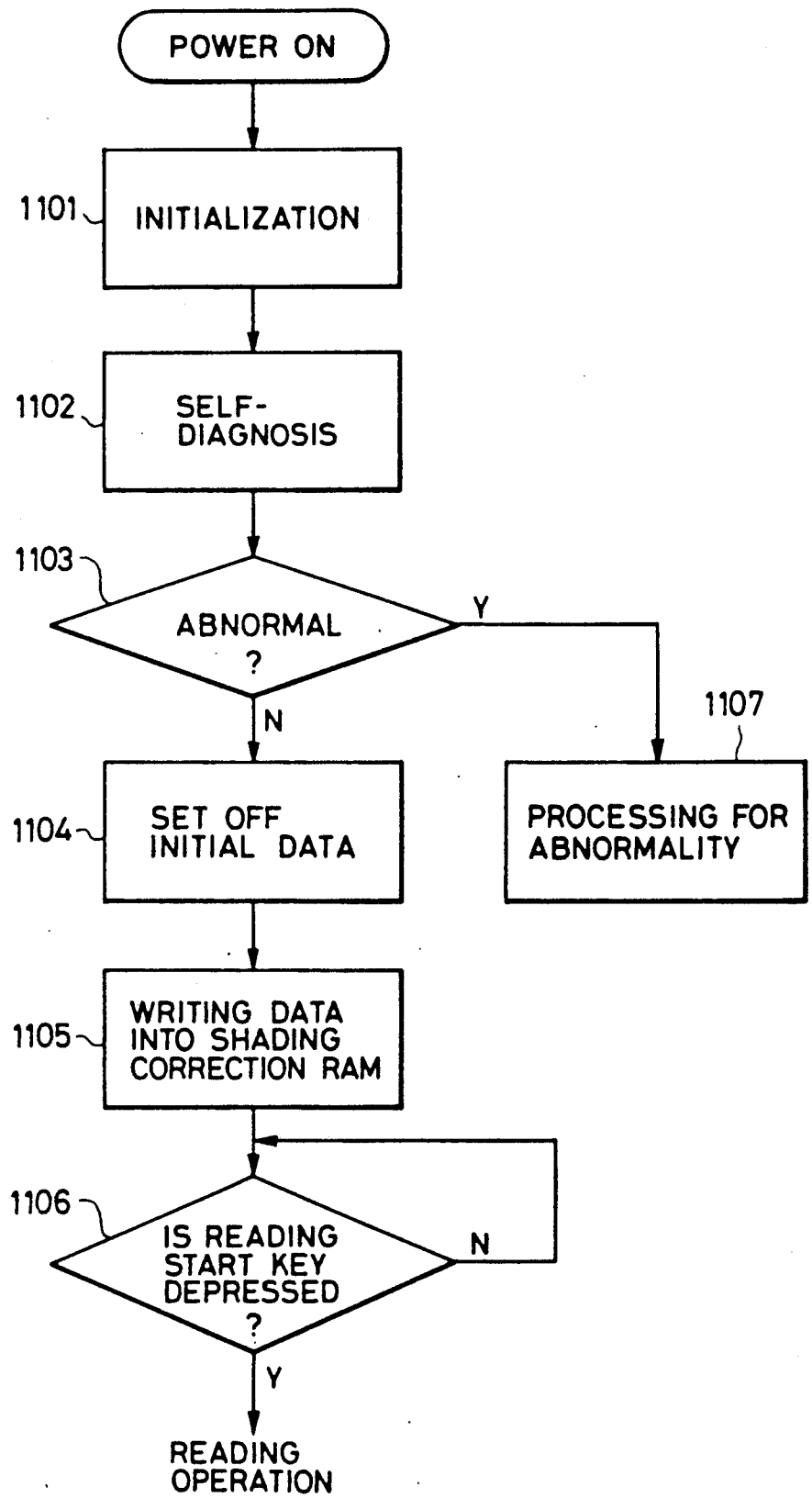
FIGS. 14, 15A and 15B are flowcharts showing an operating procedure of a CPU.

FIGS. 14 and 15 show an operating procedure of the CPU 712. This operating procedure is preliminarily stored as a program into the ROM of the microcomputer.

When the power supply is turned on, the CPU 712 initializes the I/O port and clears the RAM (step 1101). Next, by writing and reading a test pattern into and from the RAM, the self diagnosis is performed (step 1102). If it has been confirmed that no abnormality occurs (step 1103), the initialization necessary to read an image is executed (step 1104). Then, data is written into a shading correction RAM 1003 of the shading correction circuit 706, which will be explained hereinafter (step 1105). The apparatus enters the standby mode until the reading start key in the operation unit is pressed (step 1106).

If an abnormality is found out, it is indicated by an indicator (not shown) of the operation unit 713 and the abnormal position is displayed (step 1107).

Figure 12:
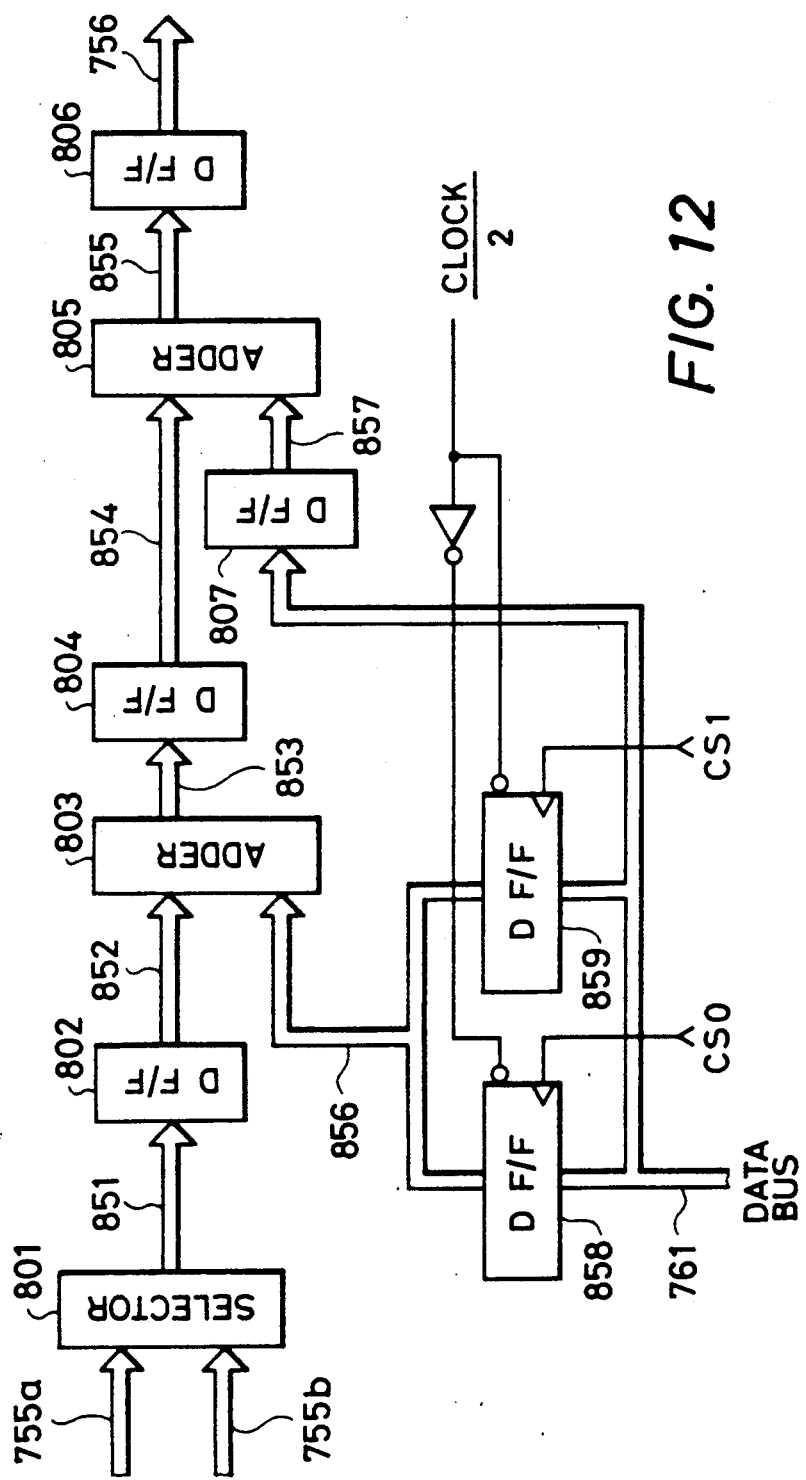
FIG. 12 is a block diagram showing a construction of an offset correction circuit shown in FIG. 11.

FIG. 12 shows a detailed construction of the offset correction circuit 705. A selector 801 alternately selects the output corresponding to the even number pixels and the output corresponding to the odd number pixels and outputs. D-type flip-flops (D F/F) 802, 804, and 806 are provided to match the data timings. When the processing speed of the circuit is slow, some of them can be also omitted.

Figure 13:
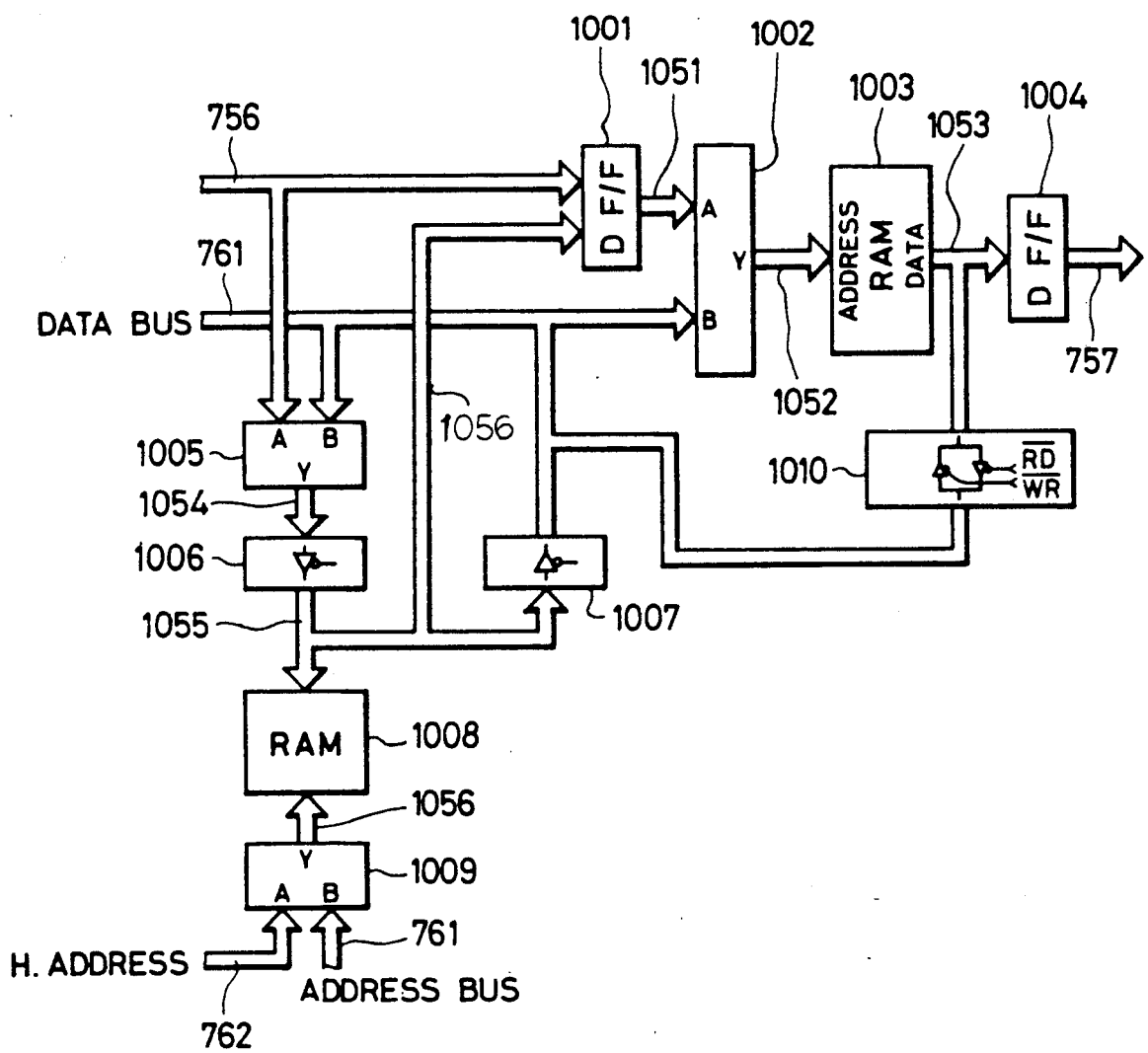
FIG. 13 is a block diagram showing a construction of a shading correction circuit.

FIG. 13 shows a detailed construction of the shading correction circuit 706.

The operation of the circuits of FIGS. 12 and 13 will be explained with reference to flowcharts of FIGS. 15A and 15B.

Figure 15A:
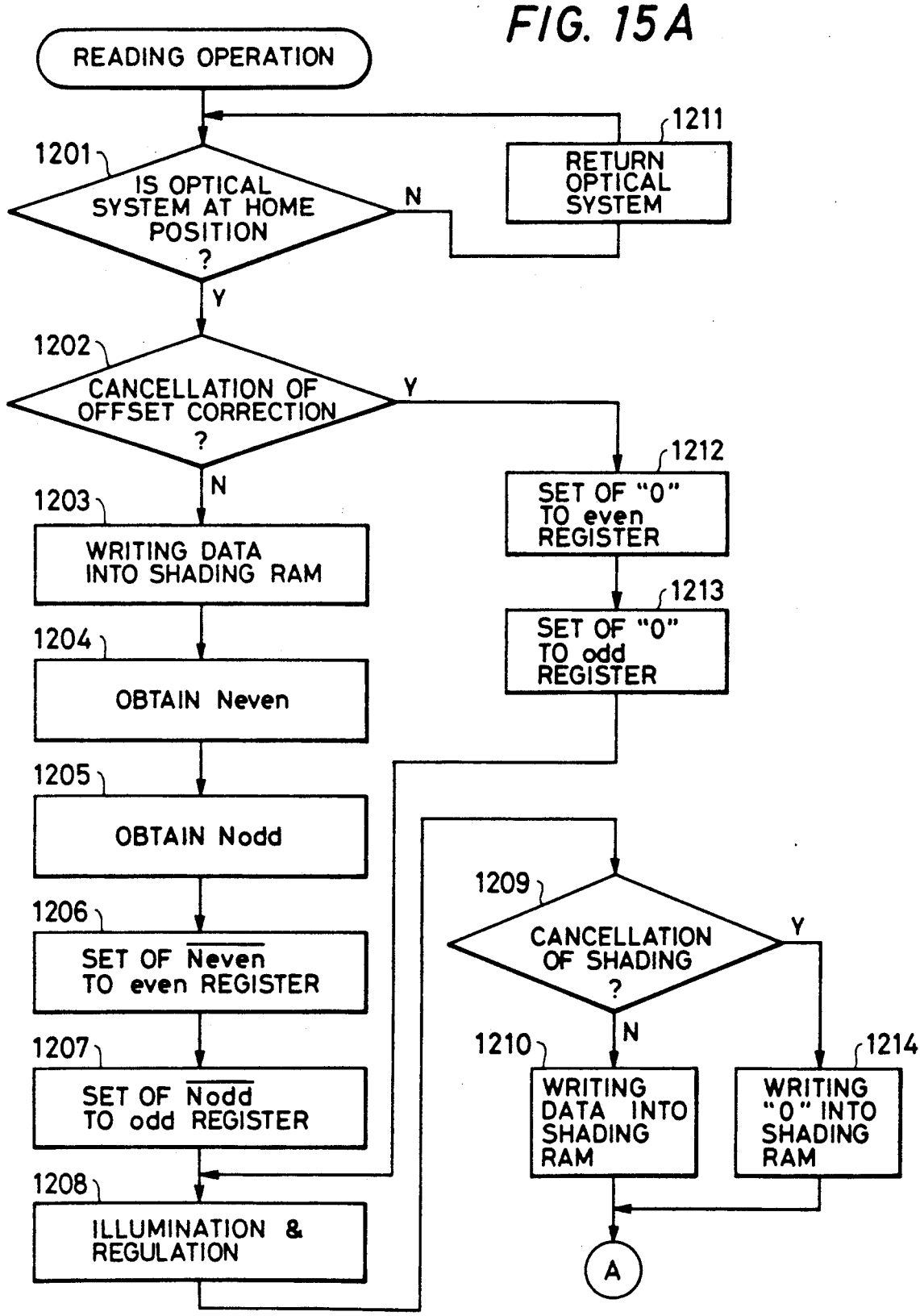
Figure 15B:
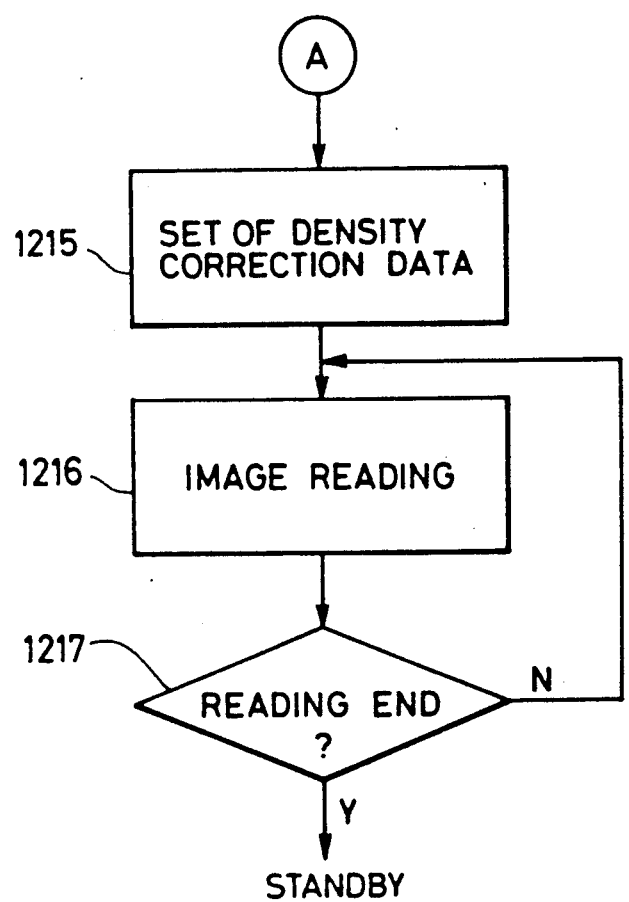

When the reading start key in the operation unit is pressed (step 1106 in FIG. 14), the CPU 712 starts the reading operation shown in FIGS. 15A and 15B. Namely, a check is made to see if the optical system (fluorescent lamp 104 and mirrors 105 to 107) is at the foregoing home position or not (step 1201). If NO, the optical system is returned to the home position. The content of the data in the RAM of the CPU 712 is searched to see if the cancellation of the offset correction has been set or not (step 1202). Before the reading operation is performed, the service person or the like switches the operating mode to the test mode by operating the operation unit 713 thereby to set the cancellation of the offset correction.

If the cancellation of the offset correction is not set, the CPU 712 sets selectors 1005 and 1009 to A and instructs so as to write the output data of the A/D converter 704 into a shading correction RAM 1008 (step 1203). Thus, the CCD 103 performs the reading operation in the state in which the fluorescent lamp 104 is not lit. The whole image data at that time is written into the shading RAM 1008 through the selector 1005 and a buffer 1006 in accordance with the designated address from the driving signal generator 711. The reason why the fluorescent lamp is turned off at the home position at this time is to reproduce the true black state by eliminating the influence by the outside light. When the data is written into the shading RAM 1008, the offset correction circuit merely outputs the input data.

Next, the CPU 712 switches the selectors 1005 and 1009 to B to access the shading RAM 1008 by the microcomputer. The CPU 712 reads out the data from the shading RAM 1008 through a buffer 1007 and obtains the mean value Neven of the data of the even number pixels (step 1204). Similarly, the mean value Nodd of the data of the odd number pixels is obtained (step 1205). The mean values corresponding respectively to the even number and odd number pixels obtained in steps 1204 and 1205 are set as complementary numbers for the even number and odd number pixels into D F/F 858 and 859 of the offset correction circuit 705 through the data bus 761 (steps 1206 and 1207).

Next, the CPU 712 sets a constant offset value into a D F/F 807. The data is latched into the D F/F 807 by the data bus 761 of the CPU 712. The data latched in the D F/F 807 is added as an offset to the image data on a signal line 854. This circuit is provided to change the reproducibility of the density of the black level. For example, the black level is adjusted in a manner such that a density above 2.0 is set to complete black or a density above 1.2 is set to complete black, or the like, thereby enabling the black level to be adjusted in accordance with the original density. When a circuit constant changes due to the temperature and the original density is varied, an amount of density change can be corrected by the offset correction circuit.

The preparation of the operation by the offset correction circuit 705 is completed in this manner.

The image data of two systems which are newly input from the CCD 103 after that are selected by the selector 801, so that the image data of one system is transmitted through the D F/F 802 and input to an adder 803 by a signal line 852. On the other hand, the output data at dark is read out of either the D F/F 858 or D F/F 859 synchronously with the input of the image data. Namely, for the input image data of the even number pixels, the output data at dark corresponding to the even number pixels is read out of the D F/F 858. On the other hand, for the input image data of the odd number pixels, the output data at dark corresponding to the odd number pixels is read out of the D F/F 859. The read-out output data at dark is input to the adder 803 through a signal line 856. Thus, the offset (dark voltage) is corrected for every pixel. For example, the signal of eight bits is produced as image data and A/D converted such that black is set to $FF_H$ and white is set to $00H$. When the data at dark stored in the D F/F 858 and 859 has a value of $OC_H$, $OC_H$ is given to the adder 803. At the same time, the image data which is set to $F3_H$ in the black state and is set to $00_H$ in the white state is given to the image signal line 852. Therefore, as the result of the addition of the adder 803, the data is converted in such a data that black is set to $FF_H$ and white is set to $OC_H$. This data is sent to the D F/F 804 through a signal line 853 and further input to an adder 805 through the signal line 854.

The adder 805 adds the value which was instructed by the CPU 712 and latched in the D F/F 807 to the output data of the adder 803 as mentioned above. The image data ought to be sent from the D F/F 804 to the adder 805 such that true black is set to $FF_H$ and true white is set to $OC_H$. However, the actual original is not in the true black state but has a certain density. Therefore, 96 data converning black of the original is $FO_H$, $OF_H$ is added to the image data by an instruction of the CPU 712. Thus, black of the original is expressed by $FF_H$ and a black density corresponding to the original is derived. Even when the adders 805 and 803 perform any addition, the results of the addition do not exceed $FF_H$. If the results of the addition exceed $FF_H$, all of them are set to $FF_H$. As described above, the offset correction of the black level of the image data is individually performed for the even number and odd number pixels. The corrected data is transmitted through a signal line 855 and D F/F 806 to a signal line 756.

The addition data which is given to the adder 805 as mentioned above is supplied from the CPU 712. A method of forming the addition data will now be explained hereinbelow.

The reflection black density of an original largely differs in dependence on the kinds of original (e.g., the kind of photograph printing, surface processing, and the like). Therefore, there occurs a case where even the complete black portion is not reproduced as a black image in dependence on the original. On the contrary, if a slightly weak portion is set to black, in the case of an original having a thick black density, the density gradation of the black portion deteriorates. To prevent this drawback, the image signal is set to be $FF_H$ in the case of complete black and the addition value is input from the operation unit in response to the black density of the original. For example, when the black level of the original is $FO_H$, the addition value $F_H$ is added. Thus, the black portion of the original is read as a black image.

On the other hand, in association with temperature changes of the clamping circuit and amplifier, the black level which is obtained from the same original varies. For example, when the black level which was set to $FO_H$ at 0° C. changes to $EC_H$ at 10° C., the level varies by about four levels per 10° C. In such a case, the atmospheric temperature is detected and the addition value is changed at the ratio of 4 levels/10° C. Thus, the density change resulting from variations in the temperature can be eliminated.

A plurality of kinds of addition values are previously stored into the ROM and selected in response to a command from the operation unit or on the basis of the result of the detected temperature. In place of the adding operation, the similar level shifting operation can be also executed by the subtracting operation.

If the cancellation of the offset correction has been set, "0" data is written into the D F/F 858 and 859 (steps 1212 and 1213). Thus, the data which is not subjected to the offset correction can be obtained for the input image data.

As described above, the image data whose black level has been corrected is input to the shading correction circuit 706 and processed.

The operation of the shading correction circuit 706 will now be explained. A selector 1002 is switched to B by the CPU 712 before the reading operation of an original image is started after the power supply is turned on, and the conversion data, which will be explained hereinafter, is written into the RAM 1003 through an I/O buffer 1010.

Namely, after the reading start key is pressed and the preparing operation for the offset correction as mentioned above is finished, the fluorescent lamp 104 is turned on and regulated so as to obtain a constant illumination light amount (step 1208). A check is then made to see if the cancellation of the shading correction has been set or not (step 1209). If NO, the selectors 1005 and 1009 are set to A. In this state, the lamp 104 illuminates the reference white plate 111 at the home position and the image of the plate 111 is read by the CCD 103. The data which has been offset corrected by the offset correction circuit 705 and input to the signal line 756 with respect to all pixels, is written into the shading RAM 1008 through the selector 1005 in accordance with the designated addresses from the driving signal generator 711 (step 1210).

Next, the output buffer 1006 is set into a high impedance to thereby disconnect the output of the selector 1005 to a signal line 1054. At the same time, the shading RAM 1003 is set to the reading mode. Thus, the standardizing operation of the shading correction by the shading correction circuit 706 is completed. The image data indicative of the original image which is newly input from the CCD 103 after that is transmitted from a D F/F 1001 through a signal line 1051 to the selector 1002 This image data is then input into the addresses $A_0$ to $A_7$ in the shading correction RAM 1003. The shading data of the same pixel as the pixel of the input image data is read out of the shading RAM 1008. The shading data is transmitted by the signal line 1055 to the D F/F 1001. Further, this data is sent by the signal line 1051 to the selector 1002 and input into the addresses $A_8$ to $A_{12}$ in the shading correction RAM 1003. In this case, upper three bits of the data in the RAM 1003 are not used. The corrected data is supplied from the RAM 1003 through a signal line 1053 to a D F/F 1004 in accordance with the addresses $A_0$ to $A_{12}$ and output to a signal line 757.

As mentioned above, the value calculated by the CPU in accordance with the expression $$y = \frac{255}{255 - z} X (x - z)$$

is set as a table into the shading correction RAM 1003 such that the data of y is output in which x and z are used as addresses before the reading operation is started (step 1105) after the power supply was turned on. x denotes the image data, z is the shading data, and y is the corrected data.

For example, when the reference white plate 111 was illuminated, if the nth pixel data stored in the RAM 1008 is set to $OC_H$, the data of $OCXX_H$ (XX is the image data which is output at present) is given to the addresses in the shading correction RAM 1003. Thus, even if there occurs the unevenness of the sensitivities of the respective pixels of the CCD, the output data is made uniform to within a range of 0 to $FF_H$ every pixel.

As described above, the unevenness of the outputs of the CCD 103 which is caused due to a variation in dark voltage which appears at dark can be corrected by the offset correction circuit 705 and shading correction circuit 706. The unevenness of the outputs of the CCD 103 which is caused due to variations in sensitivity and dark voltage which appear at light can be also corrected by those correction circuits. The uniform output which accurately corresponds to the original density is obtained.

If the cancellation of the shading correction has been set, "0" data is written into the shading correction RAM 1003 (step 1214). Thus, the image data which is not subjected to the shading correction can be derived.

As described above, the image data which was linearly corrected for the reflected light amount of the original and appeared on the signal line 757 is input to the γ correction circuit and converted into the image data which is linear to the density. On the other hand, the characteristic (curve) for the density conversion can be changed by designating a desired density by the operation unit 713 (step 1215).

After completion of the preparation of the operations for the offset correction, shading correction, and γ correction as mentioned above, the optical system is moved in the Y direction and the image of the original set on the original base 101 is read by the CCD 103 (step 1216). The offset correction, shading correction, and density correction are executed for the read-out image data as explained above. The corrected data is output to the printer 709 through the buffer memory 708.

After completion of the reading operation of the image, the apparatus is set into the standby mode (step 1217) and waits until an image data is newly read.

As described above, the CCD 103 is driven in the state in which no light is input to the image reading sensor (CCD), and the fluctuation of the respective output systems at that time is detected, thereby correcting the image data. Therefore, the level difference and absolute levels in the respective output systems can be corrected and the black level of the image can be set to a preferable level.

The data at dark for the offset correction can be also formed by reading the reference black plate by the CCD 103. The offset correction data can be also taken in and set when the power supply of the apparatus is turned on or each time the reading operations of a few times are performed without being executed every time a reading start command is input.

When the service man inputs a special key code number by the operation unit, the operating mode is set into the service display mode. Thus, the mean levels of the black offsets for the odd number pixels and even number pixels mentioned above are displayed. The service man can read these data. In this manner, for example, the operator can recognize the difference of the processing circuits for the respective outputs of the even number and odd number pixels.

As described above, with the constitution of the third embodiment, the black level can be individually corrected (offset corrected) for each output of a plurality of series of the image reading elements, so that the influences by the distortion and the like of the processing system of each series can be eliminated. A preferable image can be read.

Although the present invention has been shown and described with respect to preferred embodiments, various changes and modifications which are obvious to a person skilled in the art to which the invention pertains are deemed to lie within the spirit and scope of the invention.

I claim:

1. An image reading apparatus comprising:
   reading means, comprising a plurality of photosensing elements, for reading an image line by line and generating analog image data corresponding to each of said photosensing elements;
   a light source for exposing the image;
   conversion means for converting the analog image data generated by said reading means into digital image data pixel by pixel;
   memory means for storing digital reference data representing a reference black from said conversion means when said light source is off;
   correcting means for correcting the digital image data from said conversion means pixel by pixel on the basis of the digital reference data read out from said memory means when said reading means reads the image exposed by said source; and
   second correcting means for correcting white levels of the digital image data of which the black levels are corrected by said correcting means,
   wherein said second correcting means corrects white levels of the digital image data on the basis of digital image data output from said conversion means when said reading means reads said reference white image exposed by said light source.

2. An image reading apparatus according to claim 1, wherein said correcting means corrects black levels of the digital image data.

3. An image reading apparatus according to claim 1, wherein said memory means stores the digital image data output from said conversion means as the digital reference data before the image is read by said reading means.

4. An image reading apparatus according to claim 1, wherein said memory means stores a mean value of the digital image data output from said conversion means as the digital reference data when said light source is off.

5. An image reading apparatus according to claim 1, wherein said memory means stores a line of the digital image data output from said conversion means as the digital reference data, when said light source is off.

6. An image reading apparatus comprising:
   reading means, comprising a plurality of photosensing elements, for reading an image line by line and generating analog image data corresponding to each of said photosensing elements;
   a light source for exposing the image;
   conversion means for converting the analog image data generated by said reading means into digital image data pixel by pixel;
   memory means for storing first and second digital reference data, the first digital reference data being output from said conversion means when said light source is off and the second digital reference data being output from said conversion means when said light source is on;
   first correcting means for correcting black levels of the digital image data output from said conversion means pixel by pixel on the basis of the first digital reference data representing a reference black read out form said memory means; and
   second correcting means for correcting white levels of the digital image data, the black levels of which are corrected by said first correcting means, pixel by pixel on the basis of the second digital reference data read out from said memory means.

7. An image reading apparatus according to claim 6, wherein said first correcting means corrects black levels of the digital image data when said reading means reads the image exposed by said light source.

8. An image reading apparatus according to claim 6, wherein said second correcting means corrects white levels of the digital image data when said reading means reads the image exposed by said light source.

9. An image reading apparatus according to claim 6, further wherein said memory means further comprises first storage means for storing the digital image data output from said conversion means as the first digital reference data before the image is read by said reading means, and wherein said first correcting means corrects the black levels of the digital image data on the basis of the first digital reference data stored in said first storage means.

10. An image reading apparatus according to claim 9, wherein said memory means further comprises second storage means for storing the digital image data output from said conversion means as the second digital reference data before the image is read by said reading means, and wherein said second correcting means corrects the white levels of the digital image data on the basis of the second digital reference data stored in said second storage means.

11. An image reading apparatus according to claim 6, wherein the first digital reference data is a mean value of the digital image data output from said conversion means when said light source is off.

12. An image reading apparatus according to claim 6, wherein the second digital reference data is a line of the digital image data output from said conversion means when a reference white image is read by said reading means.

13. An image reading apparatus according to claim 6, wherein said memory means further comprises storage means for storing the digital image data output form said conversion means as the second digital reference data before the image is read by said reading means, and wherein said second correcting means corrects the white levels of the digital image data on the basis of the second digital reference data stored in said storage means.

14. An image reading apparatus comprising:
   reading means, comprising a plurality of photosensing elements, for reading an image line by line and separately generating first and second analog image data respectively corresponding to odd photosensing elements and to even photosensing elements;
   first and second conversion means for respectively converting the first and the second analog image data separately generated by said reading means into first and second digital image data;
   memory means for storing first and second digital reference data, representing a reference black, respectively output from said first and said second conversion means; and
   correcting means for correcting the first digital image data from said first conversion means on the basis of the first digital reference data read out from said memory means and correcting the second digital image data from said second conversion means on the basis of the second digital reference data read out from said memory means, when said reading means reads the image.

15. An image reading apparatus according to claim 14, wherein said correcting means corrects black levels of the first and second digital image data, respectively.

16. An image reading apparatus according to claim 15, further comprising second correcting means for correcting white levels of the first and the second digital image data black levels of which are corrected by said correcting means.

17. An image reading apparatus according to claim 14, wherein said memory means respectively stores mean values of the first and the second digital image data output from said first and second conversion means as the first and the second digital reference data before the image is read by said reading means.

18. An image reading apparatus according to claim 17, further comprising obtaining means for obtaining the mean values of a line of the first and the second digital image data.

19. An image reading apparatus according to claim 14, further having a light source to expose the image, and wherein said memory means stores the first and the second digital image data output from said first and said second conversion means as the first and the second digital reference data when said light source is off.

20. An image reading apparatus according to claim 14, further comprising selecting means for alternately selecting the first and the second digital image data, wherein said correcting means corrects the digital image data selected by said selecting means.

21. An image reading apparatus comprising:
reading means, comprising a plurality of photosensing elements, for reading an image line by line and generating analog image data corresponding to each of said photosensing elements;
conversion means for converting the analog image data generated by said reading means into digital image data pixel by pixel;
obtaining means for obtaining a mean value of a line of the digital image data representing a reference black output from said conversion means;
memory means for storing the mean value obtained by said obtaining means as digital reference data; and
correcting means for correcting the digital image data from said conversion means pixel by pixel on the basis of the digital reference data read out from said memory means when said reading means reads the image.

22. An image reading apparatus according to claim 21, wherein said correcting means corrects black levels of the digital image data.

23. An image reading apparatus according to claim 22, further comprising second correcting means for correcting white levels of the digital image data of which the black levels are corrected by said correcting means.

24. An image reading apparatus according to claim 21, wherein said memory means stores, as the digital reference data, a mean value of digital image data output from said conversion means before the image is read by said reading means.

25. An image reading apparatus according to claim 21, further comprising a light source to expose the image, and wherein said memory means stores, as the digital reference data, a mean value of the digital image data output from said conversion means when said light source is off.

26. An image reading apparatus according to claim 21, wherein said obtaining means is adapted to obtain mean values of the digital data respectively corresponding to odd and even photosensing elements of said reading means.

* * * * *

UNITED STATES PATENT AND TRADEMARK OFFICE
CERTIFICATE OF CORRECTION

PATENT NO. : 5,038,225
DATED : August 6, 1991
INVENTOR(S) : KATSUYOSHI MAESHIMA

It is certified that error appears in the above-identified patent and that said Letters Patent is hereby corrected as shown below:

Title Page:

IN [54] TITLE

"WHITE LEVEL" should read --WHITE-LEVEL--.

IN [57] ABSTRACT

Line 11, "dark output" should read --dark-output--.

COLUMN 1

Line 3, "WHITE LEVEL" should read --WHITE-LEVEL--.
   Line 13, "digital" should read --digital copying--.
   Line 18, "in to" should read --into--.
   Line 21, "photo sensing" should read --photosensing--.

COLUMN 2

Line 13, "constitu-" should read --construc- --.
   Line 55, "sub scanning" should read --sub-scanning--.

COLUMN 3

Line 59, "address bus 261" should read --address bus 262--.

COLUMN 4

Line 3, "found," should read --is found,--.
   Line 40, "address 262" should read --address bus 262--.

COLUMN 5

Line 2, "at dark" should be deleted.
   Line 36, "over" should read --exceed--.
   Line 66, "ECH" should read --$EC_H$--.

UNITED STATES PATENT AND TRADEMARK OFFICE
CERTIFICATE OF CORRECTION

PATENT NO. : 5,038,225
DATED : August 6, 1991
INVENTOR(S) : KATSUYOSHI MAESHIMA

It is certified that error appears in the above-identified patent and that said Letters Patent is hereby corrected as shown below:

COLUMN 6

Line 2, "the" (first occurrence) should be deleted and "the" (second occurrence) should read --in the--.
   Line 38, "(S606)." should read --(Step 606).--.
   Line 51, "is." should read --is--.
   Line 56, "CCD 102" should read --CCD 103--.

COLUMN 7

Line 17, "Since" should read --Hence--.

| TABLE, | "$OE_H$ | $02_H$ | should read | --$OE_H$ | $02_H$ |
|---|---|---|---|---|---|
| | $30_H$ | $25_H$ | | $30_H$ | $25_H$ |
| | $50_H$ | $47_H$ | | $50_H$ | $47_H$ |
| | $AO_H$ | $9B_H$" | | $AO_H$ | $9B_H$ -- | and "OCH" should read --$OC_H$--.

COLUMN 8

Line 13, "photo-sensing" should read --photosensing--.
   Line 19, "photo-sensing" should read --photosensing--.
   Line 31, "lit" should read --turned--.
   Line 34, "is" should read --as--.
   Line 49, "photo-sensing" should read --photosensing--.

UNITED STATES PATENT AND TRADEMARK OFFICE
CERTIFICATE OF CORRECTION

PATENT NO. : 5,038,225
DATED : August 6, 1991
INVENTOR(S) : KATSUYOSHI MAESHIMA

It is certified that error appears in the above-identified patent and that said Letters Patent is hereby corrected as shown below:

COLUMN 9

Line 1, "constructed" should read --construction--.

COLUMN 10

Line 5, "$F_{3H}$," should read --$F3_H$,--.
    Line 6, "$F_{3H}$," should read --$F3_H$,--.

COLUMN 11

Line 62, "photo-sensing" should read --photosensing--.
    Line 63, "uniformed" should read --uniform--.

COLUMN 12

Line 66, "tion," should read --tions,--.

COLUMN 13

Line 10, "photo-sensing" should read --photosensing--.

COLUMN 14

Line 31, "bus 761." should read --bus 762.--.

COLUMN 15

Line 13, "RAM 1008" should read --RAM 1003--.

UNITED STATES PATENT AND TRADEMARK OFFICE
CERTIFICATE OF CORRECTION

PATENT NO. : 5,038,225

DATED : August 6, 1991

INVENTOR(S) : KATSUYOSHI MAESHIMA

It is certified that error appears in the above-identified patent and that said Letters Patent is hereby corrected as shown below:

COLUMN 16

Line 4, "OOH." should read --$OO_H$.--.
Line 22, "96" shoudl read --if-- and "converning" should read --concerning--.
Line 60, "the" (second occurrence) should be deleted.

COLUMN 17

Line 33, "shading" should read --shading correction--.
Line 34, "RAM 1003" should read --RAM 1008--.
Line 40, "1002" should read --1002.--.

COLUMN 20

Line 2, "form" should read --from--.
Line 17, "further" (first occurrence) should be deleted.
Line 45, "form" should read --from--.

Signed and Sealed this

Twenty-fifth Day of May, 1993

Attest:

MICHAEL K. KIRK

Attesting Officer   Acting Commissioner of Patents and Trademarks